(12) United States Patent
Britton

(10) Patent No.: US 9,156,217 B2
(45) Date of Patent: Oct. 13, 2015

(54) CONTAINER WITH A RIM PORTION DEFINING AN OPENING, METHOD AND APPARATUS MAKING SAID CONTAINER

(75) Inventor: Charles Jonathan Britton, Gloucester (GB)

(73) Assignee: BRITTPAC LTD, Thames Ditton, Surrey (GB)

( * ) Notice: Subject to any disclaimer, the term of this patent is extended or adjusted under 35 U.S.C. 154(b) by 244 days.

(21) Appl. No.: 13/699,081

(22) PCT Filed: May 20, 2011

(86) PCT No.: PCT/GB2011/050960
§ 371 (c)(1),
(2), (4) Date: Feb. 8, 2013

(87) PCT Pub. No.: WO2011/144944
PCT Pub. Date: Nov. 24, 2011

(65) Prior Publication Data
US 2013/0207318 A1    Aug. 15, 2013

Related U.S. Application Data

(63) Continuation-in-part of application No. 12/827,311, filed on Jun. 30, 2010, now abandoned.

(30) Foreign Application Priority Data

May 21, 2010    (GB) .................................. 1008520.7

(51) Int. Cl.
| B29D 22/00 | (2006.01) |
| B29C 49/00 | (2006.01) |
| B29C 49/42 | (2006.01) |
| B29B 11/08 | (2006.01) |
| B29B 11/14 | (2006.01) |
| B29C 49/06 | (2006.01) |
| B29C 49/54 | (2006.01) |
| B29K 67/00 | (2006.01) |
| B29L 31/00 | (2006.01) |

(52) U.S. Cl.
CPC .......... *B29D 22/003* (2013.01); *B29C 49/0073* (2013.01); *B29C 49/4268* (2013.01); *B29B 11/08* (2013.01); *B29B 11/14* (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/14106* (2013.01); *B29B 2911/14133* (2013.01); *B29B 2911/14333* (2013.01); *B29B 2911/14366* (2013.01); *B29B 2911/14426* (2013.01); *B29B 2911/14473* (2013.01); *B29C 49/06* (2013.01); *B29C 49/541* (2013.01); *B29K 2067/00* (2013.01); *B29K 2067/003* (2013.01); *B29L 2031/716* (2013.01); *Y10T 428/13* (2015.01)

(58) Field of Classification Search
None
See application file for complete search history.

(56) References Cited

U.S. PATENT DOCUMENTS

| 4,894,268 A | 1/1990 | Greenwood et al. |
| 6,413,467 B1 | 7/2002 | Britton |

(Continued)

FOREIGN PATENT DOCUMENTS

| GB | 2388364 | 11/2003 |
| WO | 9719806 | 6/1997 |

(Continued)

*Primary Examiner* — Monica Huson
(74) *Attorney, Agent, or Firm* — C. John Brannon; Brannon Sowers and Cracraft

(57) ABSTRACT

A method is provided for making a container having a body and a rim defining an opening for the container, the opening being capable of being closed by a push-on lid, the container being made of a material which is susceptible to deformation when heated.

29 Claims, 12 Drawing Sheets

(56) References Cited

U.S. PATENT DOCUMENTS

| | | |
|---|---|---|
| 6,635,217 B1 | 10/2003 | Britton |
| 2002/0108958 A1 | 8/2002 | Britton |
| 2005/0127024 A1 | 6/2005 | Darr |
| 2006/0108315 A1 | 5/2006 | Britton |
| 2006/0226158 A1 | 10/2006 | Britton |

FOREIGN PATENT DOCUMENTS

| | | |
|---|---|---|
| WO | 9823425 | 6/1998 |
| WO | 0027607 | 5/2000 |
| WO | 2008059256 | 5/2008 |
| WO | 2008062183 | 5/2008 |

CONTAINER WITH A RIM PORTION DEFINING AN OPENING, METHOD AND APPARATUS MAKING SAID CONTAINER

CROSS-REFERENCES TO RELATED APPLICATIONS

This application is a National Stage filing of International Application PCT/GB 2011/050960, filed May 20, 2011, claiming priority to Application No. GB 1008520.7 filed May 21, 2010, and is a continuation-in-part of U.S. application Ser. No. 12/827,311 filed Jun. 30, 2010, the international application entitled "A CONTAINER WITH A RIM PORTION DEFINING AN OPENING, METHOD AND APPARATUS MAKING SAID CONTAINER" The subject application claims priority to PCT/GB 2011/050960, to GB 1008520.7, and to U.S. application Ser. No. 12/827,311, and incorporates all by reference herein, in their entirety.

This invention relates to a method of manufacturing a container which can be closed by a push-on lid, to apparatus for manufacturing the container, to a container and to a lid for the container. The invention is particularly, though not exclusively, suitable for use with containers made of PET or PEN thermoplastic materials.

BACKGROUND OF THE INVENTION

Containers made from material which is susceptible to deformation when heated, in particular thermoplastic materials such as PET or PEN, are well known. The use of such materials to manufacture the container allows a preform to be made and then subsequently expanded under pressure to obtain a finished article. The use of such preforms is known in the art, for example in WO97/19801, WO97/19806 and WO2003/095170.

Containers for materials such as paint are required to be secure, such that the lid of the container does not readily come off, e.g. when dropped from a height.

There is therefore a need for containers, made from material which is susceptible to deformation when heated, which have a design such that the lid is securely attached and does not readily come off.

SUMMARY OF THE INVENTION

The invention provides, in a first aspect, a method of making a container having a body and a rim defining an opening for the container, the opening being capable of being closed by a push-on lid, the container being made of a material which is susceptible to deformation when heated, the method comprising the steps of:

a) providing a preform made of a material which is susceptible to deformation when heated, the preform being in the shape of a closed-end tube with a rim at its mouth, the rim comprising: an outward generally-radial flange having an upper surface and a lower surface, the flange extending from a radially inner end to a radially outer end, the tube depending from the radially inner end of the flange; a first detent simultaneously formed with the flange as an upstanding elongate projection from the upper surface of the flange, which detent is located at or near the radially inner end of the flange; and a second detent simultaneously formed with the flange as an upstanding elongate projection from the upper surface of the flange, which detent is located at or near the radially outer end of the flange;

b) placing the preform in a pressure moulding apparatus at an elevated temperature with the preform being located in the apparatus at least in part by the second detent;

c) expanding the tube under pressure to form the body of the container; and then d) moving the first detent in a controlled manner downwardly and outwardly relative to the second detent so that the first detent projects inwardly into the opening for the container;

wherein the movement of the first detent downwardly and outwardly relative to the second detent is controlled such that after step d) the first detent projects inwardly into the container, with its elongate axis at an angle of from 60° to 120° to the elongate axis of the second detent, such that the first detent forms an internal rim.

Such a method is advantageous as it allows a container to be produced that has an internal rim, which can engage with a lid and prevent it from coming off, e.g. when the container is dropped.

In particular, the controlled movement of the first detent permits a product to be formed that has an internal rim in a desired location, having its elongate axis at an angle of from 60° to 120° to the elongate axis of the second detent. This contrasts with prior art techniques that only involved movement of the first detent downwardly and outwardly by virtue of the "blowing out" pressure used to expand the tube to form the body of the container. This technique has been found to, in practice, only permit the detent to be moved about 5 to 10° or so from the vertical and thus would result in an internal rim having its elongate axis at an angle of significantly less than 60° to the elongate axis of the second detent.

In other words, the present invention recognised that there was a problem associated with using the "blowing out" pressure that is used to expand the tube to form the body of the container to also move the detent to form an internal rim, as in WO97/19806 and WO2003/095170.

The controlled movement of the first detent in step d) may be the only movement of the first detent, or may be in addition to movement of the first detent associated with the expansion of the tube to form the body of the container.

In other words, when the tube is expanded under pressure to form the body of the container in step c), the first detent may be allowed to move to the extent that this is caused by the tube expanding (and therefore moving downwardly and outwardly), which can in turn cause some downward movement of the radially inner end of the flange and the first detent (which are of course attached to the tube). This movement of the first detent is not caused by blowing out pressure being exerted on it from above, but is caused by the attached tube below causing a downward pulling force as it is expanded downwardly and outwardly to form the container body.

It will of course be appreciated by the skilled reader that when reference is made to the tube being expanded outwardly, this is not the same direction as the direction moved by the first detent when it moves downwardly and outwardly with respect to the second detent. The first detent is moving to form an internal rim inside the container and so its movement is to a location within the walls of the preform tube that have expanded outwardly to form the container.

In particular, the first detent may be shielded from the pressure applied in step c). This may be due to it being located in the pressure moulding apparatus in a location that is not exposed to the pressure applied in step c). In one embodiment, the first detent is located in the pressure moulding apparatus in a location that is separated from the inside of the tube which is to be exposed to the pressure to cause expansion of the tube. This is described in more detail below.

Preferably the first detent remains shielded from the pressure applied in step c), e.g. due to it being located in the pressure moulding apparatus in a location that is not exposed to the pressure applied in step c), until after step c) is completed. Therefore it is preferred that first detent is initially located such that even after any downward movement that is caused by the tube expanding, it remains in a location that is shielded from the pressure. For example, it may be that it moves downwardly within a corridor, and moves downwardly within that corridor but no further than the mouth of the corridor.

The controlled movement of the first detent downwardly and outwardly relative to the second detent is controlled to only occur after step c). Further, any movement before step d) is not caused directly by blowing out pressure. Instead, any such movement is caused by a downward pulling force from the expansion of the tube.

The invention may, in one embodiment, provide a method of making a container having a body and a rim defining an opening for the container, the opening being capable of being closed by a push-on lid, the container being made of a material which is susceptible to deformation when heated, the method comprising the steps of:

a) providing a preform made of a material which is susceptible to deformation when heated, the preform being in the shape of a closed-end tube with a rim at its mouth, the rim comprising: an outward generally-radial flange having an upper surface and a lower surface, the flange extending from a radially inner end to a radially outer end, the tube depending from the radially inner end of the flange; a first detent simultaneously formed with the flange as an upstanding elongate projection from the upper surface of the flange, which detent is located at or near the radially inner end of the flange; and a second detent simultaneously formed with the flange as an upstanding elongate projection from the upper surface of the flange, which detent is located at or near the radially outer end of the flange;

b) placing the preform in a pressure moulding apparatus at an elevated temperature with the preform being located in the apparatus at least in part by the second detent;

c) expanding the tube under pressure to form the body of the container; and then d) moving the first detent downwardly and outwardly relative to the second detent so that the first detent projects inwardly into the opening for the container;

wherein the movement of the first detent downwardly and outwardly relative to the second detent is controlled to only occur after step c), and such that after step d) the first detent projects inwardly into the container, with its elongate axis at an angle of from 60° to 120° to the elongate axis of the second detent, such that the first detent forms an internal rim.

The invention may, in one embodiment, provide a method of making a container having a body and a rim defining an opening for the container, the opening being capable of being closed by a push-on lid, the container being made of a material which is susceptible to deformation when heated, the method comprising the steps of:

a) providing a preform made of a material which is susceptible to deformation when heated, the preform being in the shape of a closed-end tube with a rim at its mouth, the rim comprising: an outward generally-radial flange having an upper surface and a lower surface, the flange extending from a radially inner end to a radially outer end, the tube depending from the radially inner end of the flange; a first detent simultaneously formed with the flange as an upstanding elongate projection from the upper surface of the flange, which detent is located at or near the radially inner end of the flange; and a second detent simultaneously formed with the flange as an upstanding elongate projection from the upper surface of the flange, which detent is located at or near the radially outer end of the flange;

b) placing the preform in a pressure moulding apparatus at an elevated temperature with the preform being located in the apparatus at least in part by the second detent;

c) expanding the tube under pressure to form the body of the container, wherein the expansion of the tube may optionally cause some movement of the first detent; and then d) moving the first detent in a controlled manner downwardly and outwardly relative to the second detent so that the first detent projects inwardly into the opening for the container;

wherein the controlled movement of the first detent downwardly and outwardly relative to the second detent is such that after step d) the first detent projects inwardly into the container, with its elongate axis at an angle of from 60° to 120° to the elongate axis of the second detent, such that the first detent forms an internal rim.

In one embodiment of the first aspect of the invention, the controlled movement of the first detent in step d) does not begin at all until step c) of expanding the tube under pressure to form the body of the container is complete.

However, in another embodiment, it could be that step c) of expanding the tube under pressure to form the body of the container is started but has not been entirely completed when step d) of carrying out the controlled movement of the first detent is started.

It is required that step c) of expanding the tube under pressure should have at least started when step d) is started.

It may suitably be that step c) of expanding the tube under pressure to form the body of the container is completed before, or at the same time as, the completion of step d) of carrying out the controlled movement of the first detent. It is desirable that there is no further expansion of the tube to form the body of the container after the controlled movement of the detent in step d), as there should not be any further movement of the side walls of the preform tube (or the container body formed therefrom) that could in turn cause movement of the flange and first detent attached to the tube. In other words, it is desirable that the controlled movement of the first detent in step d) is the final movement of that detent, such that its position as achieved in that step is the final position in the end container. If the expansion of the preform tube continued after step d) was complete, there would be a risk that the control of the position of the internal rim would be lost.

As noted above, the present invention relates to the recognition that movement of the detent that relies on the expansion of the tube body/"blowing out" pressure being applied is not sufficient to achieve the desired location of the internal rim and furthermore is not controlled and hence cannot allow reliable and repeatable positioning of the rim. Thus it is possible to allow movement of the detent due to the expansion of the tube body before the controlled movement of the detent occurs, as the controlled movement will ensure the required further movement to achieve the intended location of the internal rim is obtained, but no movement of the detent due to the expansion of the tube body should be allowed after the controlled movement, as this could result in the internal rim not being correctly positioned.

It will be appreciated by the skilled reader that after a preform has been expanded to form a container, an indentation in the base of the container may be formed. This may be achieved by the use of a suitably shaped base plate (also known as a base punt) being moved against the outside of the base of the container whilst the material of at least that part of the container is still soft. It is conventional in the art for a pressure to be maintained within the container (e.g. for the "blowing out" pressure that was used to expand the tube to form the body of the container to be maintained) whilst the base plate engages with and shapes the base of the container, in order to ensure that the remainder of the container retains its desired shape. However it will be appreciated that any such step that is carried out is not part of step c) of expanding the tube under pressure but rather is a separate step of forming the required shape of the base of the container whilst maintaining an internal pressure within the container as required. This step does not cause expansion of the tube and hence is not a concern in terms of causing uncontrolled movement of the first detent after it has been moved into position by step d).

Therefore after step d) there may optionally be a step of forming an indentation in the base of the container.

The container must have a body and a rim defining an opening but other than this the exact size and shape of the container is not particularly limited. In one embodiment, the body of the container is substantially cylindrical in shape but it will be appreciated that other shapes are possible. The container may or may not have a neck between the body and the opening. In the present invention a container may be, for example, a bottle, a can (such as a can of the type that can contain paint), an aerosol container, or the like.

A key feature of the invention is that the first detent which forms the internal rim in the container is moved into its final position in a controlled manner after the application of pressure to expand the tube. This ensures that the desired location for the rim is achieved.

In one embodiment, the first detent is only moved to form the internal rim after the application of pressure to expand the tube, and it is moved in a controlled manner to ensure correct positioning of the internal rim. In another embodiment, the first detent is initially moved downwardly and outwardly relative to the second detent due to the expansion of the tube causing a downward force on the flange and first detent, and then after the application of pressure to expand the tube it is moved further, in a controlled manner, to ensure correct positioning of the internal rim.

Some previous methods (e.g. in WO97/19806) have specifically looked to move the detent by the application of the "blowing out" pressure. This would move the detent in an uncontrolled manner. Further, as noted above, it has been recognised that the movement achieved by this technique is only about 5 to 10 degrees from the vertical and so would result in an internal rim that was much less useable and less able to form a secure closure. In addition, the use of a controlled movement of the detent to an angle of from 60° to 120° to the elongate axis of the second detent is beneficial in that it results in significant stretching of the flange as well as movement of the detent, and therefore the location of the internal rim is significantly further inside the container. Again, this makes the internal rim more useable and provides the opportunity for a more secure closure.

The present invention provides containers that have an internal rim, where the internal rim is formed in a controlled manner such that its positioning is accurate and reproducible. This was lacking in previous techniques for making containers. The controlled reproducibility is key when obtaining a product that has an internal rim which can engage with a lid and prevent it from coming off (e.g. when the container is dropped) to a repeatable and commercially useful degree.

It was not previously even recognised that the methods used for forming internal rims in containers of this type were insufficiently accurate and reproducible to be useful for providing good and secure sealing mechanisms.

Further, the methods of the present invention permit containers to be made where the internal rim is positioned further within the container than was previously possible.

It was not previously even recognised that the methods used for forming internal rims in containers of this type were not able to provide an internal rim far enough within the container to allow good and secure sealing mechanisms.

Further, the methods of the present invention permit containers to be made where the internal rim is positioned at an angle of 90°±30° to the container's inner wall, which was not achieved in the prior methods.

It was not previously even recognised that the methods used for forming internal rims in containers of this type were not able to provide an internal rim at this angle, to ensure the container could allow good and secure sealing mechanisms.

In relation to discussion of all aspects of this invention, it should be noted that the preform and the eventual container are assumed to be in conventional orientation; that is with the mouth at the top and the base at the bottom. The terms "up" and "down", "horizontal" and "vertical", and the like, should therefore be construed in this sense, unless the context clearly indicates otherwise. However the skilled reader will appreciate that in fact the actual orientation of the preform or the container may be different from this.

The preform provided in step a) may suitably have been injection moulded.

In one embodiment, step a) comprises the step of creating the preform, using a suitable apparatus, in order to provide the preform. In one such embodiment, step a) comprises the step of injection moulding the preform in an injection moulding apparatus in order to provide the preform. In an alternative embodiment, however, the preform may be created in a separate stage (whether by injection moulding or otherwise) that is not part of the claimed method and therefore the preform is simply provided in step a), having already been made.

Therefore the container may be made in a "one stage process", where the preform is made and then converted to the container in a single process, or it may be made in a "two stage process", where the preform is made in a first process and this preform is then used in a second process, where it is converted to the container, with these two processes being separate.

For example, it may be desirable to manufacture the preforms on a first production line in a first location, and to manufacture the containers from the preforms (using the method of the first aspect) on a second production line in a second location. Equally, it might be desirable for a third party to manufacture and supply the preforms, which are then used to manufacture the containers from the preforms (using the method of the first aspect).

However, in other embodiments it may be convenient to manufacture the preforms and then manufacture the containers from the preforms on a single production line in a single location.

The preform provided in step a) has a first detent that is located at or near the radially inner end of the flange. In this regard, it is preferred that the first detent is located between the radially inner end of the flange and the midpoint of the radially inner end of the flange and the radially outer end of the flange. Accordingly, the linear distance between the first detent and the radially inner end of the flange is less than 50% than of the total linear distance between the radially inner end of the flange and the radially outer end of the flange. In one preferred embodiment, the linear distance between the first detent and the radially inner end of the flange is less than 40%, such as less than 30%, or less than 25%, of the total linear distance between the radially inner end of the flange and the radially outer end of the flange. It may be that the linear distance between the first detent and the radially inner end of the flange is 20% or less, such as 15% or less or 10% or less, of the total linear distance between the radially inner end of the flange and the radially outer end of the flange.

In one embodiment, the first detent extends from the flange for a length of from 0.5 mm or more, preferably 1 mm or more, e.g. from 1 mm to 10 mm; more preferably 1.5 mm or more, such as from 1.5 mm to 10 mm; for example 2 mm or more, e.g. from 2 mm to 5 mm. For example, the first detent may extend from the flange for a length of from 3 to 4 mm.

The mouth of the preform may in one embodiment have an internal diameter of from 25 mm or more, preferably 50 mm or more, e.g. from 50 mm to 1000 mm; more preferably 75 mm or more, such as from 75 mm to 500 mm; for example 100 mm or more, e.g. from 100 mm to 300 mm. For example, the mouth of the preform may have an internal diameter of from 100 to 250 mm.

In one embodiment, in the preform provided in step a) the first detent has its inner periphery substantially perpendicular to the upper surface of the flange. Preferably, in the preform the first detent has its outer periphery substantially perpendicular to the upper surface of the flange.

The preform provided in step a) has a second detent that is located at or near the radially outer end of the flange. In this regard, it is preferred that the second detent is located between the radially outer end of the flange and the midpoint of the radially inner end of the flange and the radially outer end of the flange. Accordingly, the linear distance between the second detent and the radially outer end of the flange is preferably less than 50% than of the total linear distance between the radially inner end of the flange and the radially outer end of the flange. In one preferred embodiment, the linear distance between the second detent and the radially outer end of the flange is less than 40%, such as less than 30%, or less than 25%, of the total linear distance between the radially inner end of the flange and the radially outer end of the flange. It may be that the linear distance between the second detent and the radially outer end of the flange is 20% or less, such as 15% or less or 10% or less, of the total linear distance between the radially inner end of the flange and the radially outer end of the flange.

In one embodiment, the preform has more than two detents simultaneously formed with the flange as an upstanding elongate projection from the upper surface of the flange, for example it may have three or more such detents, e.g. three, four or five such detents.

In a preferred embodiment, the preform provided in step a) has a third detent simultaneously formed with the flange as an upstanding elongate projection from the upper surface of the flange, located between the first detent and the second detent.

Preferably, the third detent and second detent between them define a trough, suitable for receipt of a correspondingly shaped sealing projection on the container lid, there being a sealing portion in the trough for sealing engagement with the sealing projection of the lid.

In one such embodiment, the third detent is located substantially half way between the first detent and the second detent. For example, it may be that the linear distance between the third detent and the second detent is equal to the linear distance between the third detent and the first detent, or these distances may differ by an amount that is not more than 20%, such as not more than 15%, or not more than 10%, of the total linear distance between the first detent and the second detent.

In one embodiment, the second detent is provided with an outwardly facing protrusion, suitable for engaging with an engaging portion on the container lid. The second detent may, for example, have its outer face sloped so as to create a protrusion, e.g. due to the outer face sloping outwardly from top to bottom. The second detent may equally have a separate protrusion extending from the outer face.

In one embodiment, the first detent extends continuously around the mouth of the preform provided in step a). This will provide a container that has a continuous internal rim that can be used to receive a "push-fit" type lid.

In another embodiment, the first detent is discontinuous, for example it may be made up of two or more sections, such as three, four, five, six, seven, eight, nine, ten or more sections. This will provide a container that has a discontinuous internal rim that can be used to receive a "bayonet-fit" type lid. The sections may be spaced apart regularly or irregularly. For example, the first detent may be discontinuous and made up of four or eight regularly spaced detent sections.

In one embodiment, the spaces between the detent sections are equal to or smaller than the detent sections themselves. In another embodiment, the spaces between the detent sections are larger than the detent sections themselves. Preferably, the detent sections make up 30% or more of the total circumference of the first detent, such as 40% or more, e.g. 50% or more, such as 60% or more. In one embodiment, the detent sections make up from 30% to 95% of the total circumference of the first detent, such as from 40% to 90%, e.g. from 50% to 90%, such as 60% to 85%.

In one embodiment, one or more of the detent sections are provided with a protrusion which can act to prevent rotation of the lid relative to the container.

In one embodiment, the second detent extends continuously around the mouth of the preform. This may be advantageous in providing a complete seal for the container.

In an alternative embodiment, the second detent is discontinuous around the mouth of the preform. This embodiment may be used for applications where having a sealed container is less important.

For example, the second detent may be made up of two or more sections, such as three, four, five, six, seven, eight, nine, ten or more sections. The sections may be spaced apart regularly or irregularly. In one embodiment, the spaces between the detent sections are equal to or smaller than the detent sections themselves. In another embodiment, the spaces between the detent sections are larger than the detent sections themselves. Preferably, the detent sections make up 30% or more of the total circumference of the second detent, such as 40% or more, e.g. 50% or more, such as 60% or more. In one embodiment, the detent sections make up from 30% to 95% of the total circumference of the second detent, such as from 40% to 90%, e.g. from 50% to 90%, such as 60% to 85%.

The preform and resultant container are made of a material which is susceptible to deformation when heated. This could be glass. However, the invention is particularly suitable for making containers out of certain plastics materials, particularly thermoplastics. Materials such as polyethylene terephthalate (PET), polyethylene naphathalate (PEN), and co-polymers and blends of these two materials, in both crystalline and amorphous form, could be viable. Reference to polyethylene terephthalate (PET) includes recycled PET. Reference to polyethylene terephthalate (PET) includes both white (opaque) PET and transparent PET.

In one embodiment, the preform provided in step a) is shaped such that in the resultant container the rim is narrower than the body. In one such embodiment, the preform provided in step a) is shaped with the rim narrower than the tube, such that in the resultant container the rim is narrower than the body. This is advantageous in that it allows a handle to be incorporated into the rim area without affecting the overall width of the container. Therefore the containers can be stacked together more easily, without space being wasted between containers that are placed side to side.

For example, in the resultant container the width of the rim may be 90% or less of the width of the body, such as 85% or less, e.g. 80% or less. It may be that in the resultant container the width of the rim is from 10 to 90% of the width of the body, such as from 25 to 85%, e.g. from 40 to 80%.

Step b) is suitably carried out using pressure moulding apparatus having mould parts defining a mould cavity and comprising: a securing component that permits the location of the preform in the mould cavity with the second detent in a fixed location therein; a generator of a pressure differential between the interior of the tube and the exterior to expand the tube into contact with the mould parts defining the mould cavity; and a source of controlled downward pressure, e.g. of 600 kPa or higher, that can act to move the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

Step b) may in one embodiment be carried out using pressure moulding apparatus having mould parts defining a mould cavity and comprising: (i) a securing component that permits the location of the preform in the mould cavity with the second detent in a fixed location therein, (ii) a generator of a pressure differential between the interior of the tube and the exterior to expand the tube into contact with the mould parts defining the mould cavity; (iii) a shield for shielding the first detent from the pressure that is applied to expand the tube; and (iv) a source of controlled downward pressure, e.g. of 600 kPa or higher, that can act to move the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

Preferred apparatus is of the type described further below.

The elevated temperature used in step b) is generally a temperature which is above the glass transition temperature (Tg) of the material which is susceptible to deformation. It may be a temperature that is from 1 to 50° C. above the glass transition temperature (Tg) of the material, e.g. from 5 to 45° C. or from 10 to 40° C. above the glass transition temperature (Tg) of the material. For example, the elevated temperature may suitably be 71° C. or higher, such as 75° C. or higher, e.g. 80° C. or higher, such as from 80 to 110° C., for PET.

Step c) may involve expanding the tube under pressure to form the body of the container in any conventional manner.

In one embodiment, step c) may comprise applying differential pressure between the interior of the preform and the exterior of the preform, to expand the tube portion to form the body of the container.

In one embodiment, step c) may involve the injection of air or other gas under pressure into the tube, to expand it into the shape of the container body as defined by the interior surfaces of the mould parts in the pressure moulding apparatus.

The air or other injected gas may be at any suitable pressure above atmospheric pressure. For example, the pressure may be 200 kPa or higher, e.g. 300 kPa or higher, such as 500 kPa or higher, e.g. from 300 to 5000 kPa or from 500 to 4000 kPa or from 600 to 3000 kPa. In one embodiment, the pressure is from 700 to 1000 kPa.

In one embodiment, a pressure is applied to expand the tube which may be from 300 to 950 kPa, e.g. from 400 to 900 kPa or from 500 to 700 kPa.

It may be that this pressure is followed by application of a second, higher, pressure. This may be known in the art as using a pre-blow pressure and a final pressure. For example, the pre-blow pressure may be applied first and then when the preform tube walls touch the inside of the mould wall, the second, higher, pressure may be applied, e.g. of from 3000 to 5000 kPa. This 'final blow' and is often used to ensure good forming of detailed parts of the moulded product, such as ribs.

Optionally, step c) may comprise longitudinally stretching the tube portion of the preform. It may be that this is in addition to the injection of air or other gas under pressure into the tube. The longitudinal stretching may be before, during or after the injection of gas.

The expansion of plastic preforms under pressure is known (e.g. from WO97/19801 and WO97/19806) and can be carried out at any suitable temperature and pressure.

As discussed above in relation to step b), the temperature is suitably above the glass transition temperature (Tg) of the material, e.g. it may be a temperature that is from 1 to 50° C. above the glass transition temperature (Tg) of the material, e.g. from 5 to 45° C. or from 10 to 40° C. above the glass transition temperature (Tg) of the material.

As discussed above, there is no controlled movement of the first detent until after step c). In one embodiment the first detent is not moved until after step c). In another embodiment the first detent is moved due to downward force caused by the expansion of the attached tube before the first detent is moved in a controlled manner in step d).

In one embodiment, the first detent is shielded from the pressure applied in step c). This may be due to it being located in the pressure moulding apparatus in a location that is not exposed to the pressure applied in step c). In one embodiment, the first detent is located in the pressure moulding apparatus in a location that is separated from the inside of the tube which is to be exposed to the pressure to cause expansion of the tube.

In one such embodiment, the first detent is located in a section within the pressure moulding apparatus, wherein this section is separated from the inside of the tube which is to be exposed to pressure, to cause expansion of the tube, by a shielding wall. The shielding wall seals the section away from the inside of the tube which is to be exposed to pressure, and therefore prevents the first detent from being exposed to this pressure.

For example, in one embodiment the first detent is located in the pressure moulding apparatus in a corridor whereby a wall of the corridor contacts the preform at a point between where the tube extends from the radially inner end of the flange and the first detent, such that the wall forms a barrier between the first detent and the parts of the preform exposed to pressure in step c).

It may be beneficial for the first detent to be allowed to move downwardly, due to the downward force caused by the expansion of the tube, before step d) is carried out. It has been determined that the first detent is more susceptible to the controlled movement if it has already begun to move during step c). In particular, as noted above, this can result in the detent also moving to an angle of about 5 to 10° to the elongate axis of the second detent and this again makes the first detent more amenable to being forced downwardly by a controlled directional force in step d). It may in particular provide a greater surface area for contact between the surface of a mechanical device, such as a piston, and the first detent. This therefore provides good and repeatable results for the method of the invention.

Preferably, the inward projection of the detent after step d) is such that its elongate axis is at an angle of from 65° to 115° to the elongate axis of the second detent, such as from 70° to 110°, more preferably from 75° to 105°, for example from 80 to 100°, most preferably from 85 to 95°, such as from 87 to 93°, e.g. about 90°.

In one embodiment, the inward projection of the detent after step d) is such that it does not extend substantially beyond perpendicular to the elongate axis of the second detent. For example, its elongate axis may be at an angle of from 65° to 95° to the elongate axis of the second detent, such as from 70° to 90°, more preferably from 80 to 90°, most preferably from 85 to 90°.

In the event that there is a third detent in the preform, preferably in step d) the first detent is moved whilst supporting the second and third detents in a fixed position, so as to cause the first detent to move downwardly and outwardly with respect to the second and third detents.

Preferably, in step d) the movement of the first detent may be achieved by applying downward pressure of 600 kPa or higher, e.g. from 600 to 2000 kPa, to the first detent, whilst supporting the second detent in a fixed position, so as to cause the first detent to move downwardly and outwardly with respect to the second detent. For example, a pressure of 650 kPa or higher, preferably 700 kPa or higher, such as 750 kPa or higher, e.g. 800 kPa or higher, more preferably 900 kPa or higher, preferably 1000 kPa or higher, e.g. 1100 kPa or higher, or even 1200 kPa or higher may be used. In one embodiment, the pressure used is from 650 to 2000 kPa or higher, such as from 700 to 1800 kPa or higher or from 750 to 1500 kPa or higher. It may, for example, be from 800 kPa to 1800 kPa or higher or from 900 kPa to 1500 kPa or higher. In one embodiment it is from 1000 kPa to 1800 kPa or higher, preferably from 1000 kPa to 1700 kPa or higher, for example from 1100 kPa to 1600 kPa or higher, or from 1100 kPa to 1500 kPa or higher. For example, a pressure of around 1500 kPa may be used in some embodiments.

In one embodiment, the pressure to position the internal rim is applied for 0.05 s or more, such as from 0.05 s to 1 second or more, for example from 0.05 to 0.8 s or more, such as from 0.05 to 0.7 s or more, e.g. from 0.1 to 0.6 s or more, for example from 0.1 to 0.5 s or more, such as about 0.3 s to 0.5 s or more.

In one embodiment, the internal rim is formed and in the required position after the pressure has been applied for 0.05 s or more, e.g. from 0.05 s to 2 s or from 0.05 s to 1.5 s, such as from 0.05 s to 1 second, for example from 0.05 to 0.8 s, such as from 0.05 to 0.7 s, e.g. from 0.1 to 0.6 s, for example from 0.1 to 0.5 s, such as about 0.3 s.

However, the device that applies pressure may remain active beyond the period of time required to form the internal rim in the required position. For example, if the pressure is applied using a mechanical device, such as a piston, that may remain in place after the internal rim has been formed and is in the required position. In particular, it may remain in place for 0.05 s or more after the rim is in position, e.g. for 0.5 s or more after the rim is in position, such as from is to 5 s after the rim is in position.

In one embodiment, the device may remain in place until all required actions relating to the formation of the container have been completed, for example it may remain in place whilst an indentation is formed in the base of the container.

Step d) may apply pressure in any suitable manner; for example hydraulically, pneumatically or elastically.

In one embodiment, a device may be used that applies pressure using a mechanical spring (e.g. a helical spring, which may, for example, be cylindrical, conical, barrel shaped or hourglass shaped and may have constant or variable pitch), or compressed gas (e.g. compressed air or compressed nitrogen) or compressed liquid (e.g. compressed oil or compressed aqueous fluid, such as water).

For example, a mechanical device that applies pressure using a mechanical spring, hydraulics or pneumatics may be considered. A nitrogen spring may be used in one embodiment.

In one embodiment, step d) uses a mechanical device, such as a piston, to place downward pressure on the first detent. The piston movement is controlled to ensure that after step d) the first detent projects inwardly into the container, with its elongate axis at an angle of from 60° to 120° to the elongate axis of the second detent, such that the first detent forms an internal rim. The piston may be, for example, pneumatic or hydraulic. In this regard, the piston may be physically prevented from moving beyond a set distance that corresponds to movement of the first detent to a location where it projects inwardly into the container, with its elongate axis at an angle of 120° to the elongate axis of the second detent. For example, a stop or block may be provided in the pressure moulding apparatus that prevents the piston from moving beyond a set distance. A casing, such as a steel casing, may act as a stop to prevent the piston from moving beyond a set distance. A cushion may be used to aid smooth operation.

Equally, the movement of the piston may be computer controlled, with the computer controlling the movement of the piston so that it does not move beyond a set distance that corresponds to movement of the first detent to a location where it projects inwardly into the container, with its elongate axis at an angle of 120° to the elongate axis of the second detent.

In one embodiment, the rim includes a downward flange depending from the lower face of the radial flange. The downward flange may extend from the flange at any location that is outward of the first detent. For example, it may be substantially half way between the first detent and the second detent, or it may be closer to the second detent than the first detent.

In one such embodiment, in step d) the lower surface of the radial flange moves into homogeneous contact with the downward flange.

In one embodiment, the method further comprises the step of:

e) filling the container with a product.

In one embodiment, after step d) or optional step e), the method further comprises the step of:

f) fitting a lid to the container, in which the lid includes (i) a trough, suitable for receipt of and engagement with the second detent, and (ii) an engaging portion for receipt under and engagement with the inner rim formed by the first detent, to secure the lid on the container.

The engaging portion of the lid may, in one embodiment, be discontinuous around the lid. In one such embodiment, the first detent is also discontinuous.

Accordingly, the engagement of the engaging portion with the inner rim formed by the first detent may provide a push and twist, bayonet style, fastening of the lid to the container. The step f) may therefore involve pushing and twisting the lid onto the container.

In an alternative embodiment, the first detent, and hence the inner rim, is continuous. In such an embodiment, the engagement of the engaging portion with the inner rim formed by the first detent may provide a push fit fastening of the lid to the container. The step f) may therefore involve push-fitting the lid onto the container.

In optional step e), the product placed into the container may be any product that can be stored in a push fit or bayonet fit container. It may be a solid product, including powders, or a liquid product, including emulsions. For example, it may be paint, varnish, or ink, medication (in liquid form or in solid form, e.g. tablets), food supplements (such as vitamin supplements or herbal remedies), industrial chemicals, food or drink (e.g. tea bags, instant or ground coffee, milk, including powdered or dry milk, biscuits, cereal, pasta, rice), fuel (e.g. petrol, diesel); detergent products, e.g. for laundry or dishwashing, in powder or tablet or liquid form (such as dishwasher tablets, dishwasher salt, laundry powder or tablets); or pet food (e.g. dog biscuits).

In a second aspect, the invention provides a container obtainable by the method of the first aspect. The container is, therefore, made of a material which is susceptible to deformation when heated, and the container comprises a body portion and a rim portion, the body portion having a base wall and a side wall extending upwardly therefrom, the rim portion extending from the side wall and providing an opening constituting the mouth of the container, the rim portion including an inwardly facing detent facing into the opening and a first upwardly facing detent facing upwards from the opening, located at or near the radially outer edge of the rim, wherein the inwardly facing detent projects inwardly into the container with its elongate axis at an angle of from 60° to 120° to the elongate axis of the first upwardly facing detent, such that the first detent forms an internal rim.

The container as made by the method of the first aspect differs from a product as made in accordance with the prior art methods, such as WO2003/095170 and WO97/19806.

In particular, as noted above, in those methods, where a detent is moved to form the inwardly facing detent solely by the blowing out of the preform body it is not possible for the detent to move to a position more than about 5 to 10° to the elongate axis of the first upwardly facing detent. Although the illustrations in those patent documents suggest movement by a larger degree, in practice it has been determined that this is simply not possible using the blowing out force described in those documents, which is not concentrated on the detent in a single direction. Certainly the methods described in those patent documents would not permit the detent to be moved such that it projects inwardly into the container with its elongate axis at an angle of from 60° to 120° to the elongate axis of the first upwardly facing detent.

Further, in those methods, where a detent is moved to form the inwardly facing detent by the blowing out of the preform body, the distance between the mouth of the container and the inwardly facing detent is substantially the same as the distance in the preform between the detent located at or near the radially inner end of the flange, which will form the inwardly facing detent, and its adjacent detent on the flange. This is because the blowing out force is not concentrated in a single direction and hence does not cause any significant stretching of the flange portion between the detents when the first detent is moved downwardly and outwardly. Therefore there is no significant lengthening of this distance.

In contrast, in the present invention, there is a controlled movement of the detent which forms the inwardly facing detent. This therefore involves a focussed force in a downward direction, which consequently causes a stretching of the flange portion between the detents as the first detent is moved downwardly and outwardly. Therefore there is significant lengthening of this distance.

For example, in a prior art container as made by the methods that involve moving the detent downwardly and outwardly by a blowing out force, as in WO2003/095170 and WO97/19806, the distance between the mouth of the container and the inwardly facing detent may be no more than 25% different to the distance in the preform between the two detents, such as no more than 20% different, no more than 15% different, no more than 10% different, or no more than 5% different, to the distance in the preform between the two detents.

In a container of the prior art, the distance between the mouth of the container and the inwardly facing detent may therefore be around 1 mm to 2.5 mm.

In contrast, in the containers of the present invention, the distance between the mouth of the container and the inwardly facing detent may be 150% or more of the distance in the preform between the two detents, such as 200% or more, 250% or more, 300% or more, or 350% or more, of the distance in the preform between the two detents.

In a container of the invention, the distance between the mouth of the container and the inwardly facing detent may therefore be around 3 mm or more, such as from 3.5 mm to 15 mm, e.g. from 4 mm to 10 mm, such as from 5 mm to 8 mm.

In addition, due to the stretching that occurs in the present invention, the flange portion between the detents becomes thinner when the first detent is moved downwardly and outwardly relative to the second detent, so that the first detent projects inwardly into the opening for the container. Therefore the section of the wall between the mouth of the container and the inwardly facing detent is thinner in the present containers than in the prior art containers with an inwardly facing detent.

Further, due to the nature of the stretching, in the present containers the section of the wall between the mouth of the container and the inwardly facing detent does not have a constant thickness. In contrast, because the flange portion between the detents is not stretched in the prior art methods, this section is of constant thickness.

Preferably, the inward projection of the inwardly facing detent is such that its elongate axis is at an angle of from 65° to 115° to the elongate axis of the first upwardly facing detent, such as from 70° to 110°, more preferably from 75° to 105°, for example from 80 to 100°, most preferably from 85 to 95°, such as from 87 to 93°, e.g. about 90°.

In one embodiment, the inward projection of the detent is such that it does not extend substantially beyond perpendicular to the elongate axis of the first upwardly facing detent. For example, its elongate axis may be at an angle of from 65° to 95° to the elongate axis of the first upwardly facing detent, such as from 70° to 90°, more preferably from 80 to 90°, most preferably from 85 to 90°.

In one embodiment, the inwardly facing detent extends inwardly for a length of from 0.5 mm or more, preferably 1 mm or more, e.g. from 1 mm to 10 mm; more preferably 1.5 mm or more, such as from 1.5 mm to 10 mm; for example 2 mm or more, e.g. from 2 mm to 5 mm.

In one embodiment, the rim has more than one upwardly facing detent facing upwards from the opening, for example it may have two or more such detents, e.g. two, three or four such detents.

In a preferred embodiment, the container has a second upwardly facing detent facing upwards from the opening. For example, this may be located at or near the radially inner edge of the rim.

Preferably, the first and second upwardly facing detents between them define a trough, suitable for receipt of a correspondingly shaped sealing projection on the container lid, there being a sealing portion in the trough for sealing engagement with the sealing projection of the lid.

In one preferred embodiment, the first upwardly facing detent is provided with an outwardly facing protrusion, suitable for engaging with an engaging portion on the container lid. The detent may, for example, have its outer face sloped so as to create a protrusion, e.g. due to the outer face sloping outwardly from top to bottom. The detent may equally have a separate protrusion extending from the outer face.

In one embodiment, the rim includes a downwardly facing flange facing downwards from the opening. The downwardly facing flange may extend downwardly at or near the inner edge of the rim, or it may be closer to the outer edge than the inner edge.

In one embodiment, the inwardly facing detent extends continuously around the mouth of the container.

In another embodiment, the inwardly facing detent is discontinuous, for example it may be made up of two or more sections, such as three, four, five, six, seven, eight, nine, ten or more sections. The sections may be spaced apart regularly or irregularly.

For example, the inwardly facing detent may be discontinuous and made up of four or eight regularly spaced detent sections.

In one embodiment, the spaces between the inwardly facing detent sections are equal to or smaller than the detent sections themselves. In another embodiment, the spaces between the detent sections are larger than the detent sections themselves. Preferably, the detent sections make up 30% or more of the circumference of the inwardly facing detent, such as 40% or more, e.g. 50% or more, such as 60% or more. In one embodiment, the detent sections make up from 30% to 95% of the total circumference of the inwardly facing detent, such as from 40% to 90%, e.g. from 50% to 90%, such as 60% to 85%.

In one embodiment, the first upwardly facing detent extends continuously around the mouth of the preform.

The container is made of a material which is susceptible to deformation when heated. This could be glass. However, the invention is particularly suitable for containers made out of certain plastics materials, particularly thermoplastics. Materials such as polyethylene terephthalate (PET), polyethylene naphathalate (PEN), and co-polymers and blends of these two materials, in both crystalline and amorphous form, could be viable.

Preferably the rim is narrower than the body of the container. Preferably, in the container the width of the rim is 90% or less of the width of the body, such as 85% or less, e.g. 80% or less. This is advantageous in that it allows a handle to be incorporated into the rim area without affecting the overall width of the container. Therefore the containers can be stacked together more easily, without space being wasted between containers that are placed side to side. It may be that in the container the width of the rim is from 10 to 90% of the width of the body, such as from 25 to 85%, e.g. from 40 to 80%.

The invention provides, in a third aspect, a lid for use with the container of the second aspect, the lid having (i) a peripheral trough suitable for receipt of and engagement with the first upwardly facing detent, (ii) an engaging portion located radially inwardly from the peripheral trough for receipt under and engagement with the inwardly facing detent, to secure the lid on the container.

The engaging portion of the lid may, in one embodiment, be discontinuous around the lid. Accordingly, the engagement of the engaging portion with the inwardly facing detent may provide a push and twist, bayonet style, fastening of the lid to the container.

There may, for example, be three or more sections, such as four, five, six, seven, eight, nine, ten or more sections. The sections may be spaced apart regularly or irregularly. For example, the engaging portion of the lid may be discontinuous and made up of four or eight regularly spaced sections.

In one embodiment, the spaces between the sections are equal to or smaller than the sections themselves. In another embodiment, the spaces between the sections are larger than the sections themselves. Preferably, the spaces make up 20% or more of the circumference of the engaging portion of the lid, such as 30% or more, e.g. 40% or more, such as 50% or more. In one embodiment, the spaces make up from 20% to 80% of the total circumference of the engaging portion of the lid, such as from 30% to 70%, e.g. from 40% to 60%.

One or more of the engaging portions may be provided with a protrusion which can act to prevent rotation of the lid relative to the container.

Alternatively, the engaging portion of the lid may, in one embodiment, be continuous around the lid. Accordingly, the engagement of the engaging portion with the inwardly facing detent may provide a push fit style fastening of the lid to the container.

The peripheral trough may, in one embodiment, be defined between inner and outer cylindrical flanges, wherein the inner cylindrical flange is fixed and the outer cylindrical flange is hinged so that it can move from an open position where it does not engage with the first upwardly facing detent to a closed position where it does engage with the first upwardly facing detent. In particular, this may be a "click-lock" type hinge. In such an embodiment the lid is made from a material that is sufficiently flexible to permit the formation of such a hinge, such as polypropylene or polyethylene.

The outer cylindrical flange may be continuous or discontinuous.

The outer cylindrical flange may, for example, have three or more sections, such as four, five, six, seven, eight, nine, ten or more sections. The sections may be spaced apart regularly or irregularly.

For example, the outer cylindrical flange may be discontinuous and made up of four, six or eight regularly spaced sections.

The spaces between the sections may be equal to or smaller than the sections themselves. Alternatively, the spaces between the sections are larger than the sections themselves. Preferably, the sections make up 30% or more of the circumference of the outer cylindrical flange, such as 40% or more, e.g. 50% or more, such as 60% or more. In one embodiment, the sections make up from 30% to 95% of the total circumference of the outer cylindrical flange, such as from 40% to 90%, e.g. from 50% to 90%, such as 60% to 85%.

In an alternative embodiment, the peripheral trough is defined between fixed inner and outer cylindrical flanges.

In this alternative embodiment the corresponding container may optionally be provided with external lugs to enhance the strength and security of the closure. These lugs are provided on the injection moulded preform from which the container is formed and are unaffected by the pressure blow moulding of the container. The lugs are located below the second detent and project outwardly from the container. For example, in a preferred embodiment the container is provided with a downward flange depending from the lower face of the radial flange and the lugs are located on the outside surface of this flange.

The container may, for example, have two or more sections, such as three, four, five, six, seven, eight, nine, ten or more lugs. The lugs may be spaced apart regularly or irregularly.

For example, the container may have four, six or eight regularly spaced lugs around its outer periphery.

In this alternative embodiment, the fixed outer cylindrical flange may be shaped to engage with any such external lugs, so that the lugs act to further hold the lid in place on the container.

The outer cylindrical flange is preferably discontinuous. The outer cylindrical flange may, for example, have three or more sections, such as four, five, six, seven, eight, nine, ten or more sections. The sections may be spaced apart regularly or irregularly.

For example, the outer cylindrical flange may be discontinuous and made up of four, six or eight regularly spaced sections.

The spaces between the sections may be equal to or smaller than the sections themselves. Alternatively, the spaces between the sections are larger than the sections themselves. Preferably, the sections make up 30% or more of the circumference of the outer cylindrical flange, such as 40% or more, e.g. 50% or more, such as 60% or more.

In such an embodiment, the lid may be made of plastics materials, such as thermoplastics, including polyethylene, polypropylene, polyethylene terephthalate (PET), polyethylene naphathalate (PEN), and co-polymers and blends thereof, in both crystalline and amorphous form. Reference to polyethylene terephthalate (PET) includes recycled PET. It may also be made of metal, including alloys, wood, or glass.

In a fourth aspect of the invention, there is provided a closed container, comprising a container in accordance with the second aspect and a lid in accordance with the third aspect, wherein the lid seals the container.

In one embodiment, the closed container may contain product. The product may be any product that can be stored in a push fit or bayonet fit container. It may be a solid or liquid product, including emulsions. For example, it may be paint, varnish, or ink, medication (in liquid form or in solid form, e.g. tablets), food supplements (such as vitamin supplements), industrial chemicals, or fuel (e.g. petrol, diesel).

In a fifth aspect, the invention provides apparatus for making a container having a body and a rim portion defining an opening for the container, the opening being capable of being closed by a push-on lid, the apparatus comprising:

pressure moulding apparatus having mould parts defining a mould cavity and comprising: a securing component that permits the location of the preform in the mould cavity with the second detent in a fixed location therein; a generator of a pressure differential between the interior of the tube and the exterior to expand the tube into contact with the mould parts defining the mould cavity; and a source of controlled downward pressure, e.g. of 600 kPa or higher, that can act to move the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

In one embodiment, the apparatus is suitable for making a container in accordance with the second aspect.

In one embodiment, the apparatus is suitable for carrying out a method in accordance with the first aspect.

Preferably, the source of controlled downward pressure can apply a pressure of 650 kPa or higher, preferably 700 kPa or higher, such as 750 kPa or higher, e.g. 800 kPa or higher, more preferably 900 kPa or higher, such as 1000 kPa or higher, e.g. 1100 kPa or higher, or 1200 kPa or higher.

In one embodiment, the source of controlled downward pressure can apply a pressure of 600 kPa or higher (such as 700 kPa or higher, 800 kPa or higher, 900 kPa or higher, 1000 kPa or higher, 1100 kPa or higher, or 1200 kPa or higher) for from 0.05 s or more, preferably from 0.1 to 1 second or more, for example from 0.2 to 0.8 s or more, such as from 0.3 to 0.7 s or more, e.g. from 0.4 to 0.6 s or more, such as from about 0.3 s to about 0.5 s or more.

In one embodiment, the source of controlled downward pressure can apply a pressure beyond the period of time required to form the internal rim in the required position. For example, the source of controlled downward pressure may be one that can apply a pressure for 0.05 s or more after the rim is in position, e.g. for 0.5 s or more after the rim is in position, such as from is to 5 s after the rim is in position.

The source of controlled downward pressure may apply pressure in any suitable manner; for example hydraulically, pneumatically or elastically.

In one embodiment, it may apply pressure using a mechanical spring (e.g. a helical spring, which may, for example, be cylindrical, conical, barrel shaped or hourglass shaped and may have constant or variable pitch), or compressed gas (e.g. compressed air or compressed nitrogen) or compressed liquid (e.g. compressed oil or compressed aqueous fluid, such as water).

For example, the source of controlled downward pressure may be a mechanical device that applies pressure using a mechanical spring, hydraulics or pneumatics may be considered. A nitrogen spring may be used in one embodiment.

Preferably, the source of controlled downward pressure comprises a mechanical device, such as a piston, to place downward pressure on the first detent. The piston movement may be controlled to ensure that the first detent projects inwardly into the container, with its elongate axis at an angle of from 60° to 120° to the elongate axis of the second detent, such that the first detent forms an internal rim. The piston may be, for example, pneumatic or hydraulic.

The piston may be physically prevented from moving beyond a set distance that corresponds to movement of the first detent to a location where it projects inwardly into the container, with its elongate axis at an angle of from 60° to 120° to the elongate axis of the second detent. In this regard, the apparatus suitably includes a component for physically preventing the piston from moving beyond a set distance that corresponds to movement of the first detent to a location where it projects inwardly into the container, with its elongate axis at an angle of from 60° to 120° to the elongate axis of the second detent. For example, a stop or block may be provided in the pressure moulding apparatus that prevents the piston from moving beyond a set distance. A casing, such as a steel casing, may act as a stop to prevent the piston from moving beyond a set distance. A cushion may be used to aid smooth operation.

Equally, a computer may be included and the movement of the piston may be computer controlled, with the computer controlling the movement of the piston so that it does not move beyond a set distance that corresponds to movement of the first detent to a location where it projects inwardly into the container, with its elongate axis at an angle of from 60° to 120° to the elongate axis of the second detent.

The generator of a pressure differential between the interior of the tube and the exterior to expand the tube into contact with the mould parts defining the mould cavity may suitably comprise a source of pressurised gas, such as pressurised air.

Suitably, this may comprise a blow core that has a central throughway through which a flow of air or other gas under pressure can be blown into the interior of the tubular portion of the preform. An air inlet guide bush may be provided within the blow core. The blow core may, in use, extend into the tubular section below the periphery of the rim portion of the preform.

The apparatus may further comprise a stretching component that can be used to longitudinally stretch the tube portion of the preform. This may, for example, be a stretch rod or pin. This component may be provided as part of the generator of a pressure differential. For example, a blow core may be provided that has a blow pin passing through its longitudinal cavity, which in use can be extended to reach the bottom of the mould cavity.

The securing component that permits the location of the preform in the mould cavity with the second detent in a fixed location therein may suitably comprise a shaped cavity or seat for receipt of the second detent. The shape of the shaped cavity or seat can be such that the second detent is securely received and has limited movement in a horizontal direction.

There may optionally be a securing component that permits the location of the preform in the mould cavity with the third detent (when present) in a fixed location therein. This component may suitably comprise a shaped cavity or seat for receipt of the third detent. The shape of the shaped cavity or seat can be such that the third detent is securely received and has limited movement in a horizontal direction.

It may be that the apparatus of the fifth aspect includes a shield for shielding the first detent from the pressure that is applied to expand the tube. Therefore in one embodiment, the invention provides apparatus for making a container having a body and a rim portion defining an opening for the container, the opening being capable of being closed by a push-on lid, the apparatus comprising:

pressure moulding apparatus having mould parts defining a mould cavity and comprising: (i) a securing component that permits the location of the preform in the mould cavity with the second detent in a fixed location therein, (ii) a generator of a pressure differential between the interior of the tube and the exterior to expand the tube into contact with the mould parts defining the mould cavity; (iii) a shield for shielding the first detent from the pressure that is applied to expand the tube; and (iv) a source of controlled downward pressure, e.g. of 600 kPa or higher, that can act to move the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

Preferably, the shield is provided by the inclusion of a section within which the first detent can be located, which section can act to shield the first detent from the pressure that is applied to expand the tube.

In one such embodiment, the pressure moulding apparatus includes a section within which the first detent can be located, this section being separated from the inside of the tube which is to be exposed to pressure to cause expansion of the tube by a shielding wall. The shielding wall seals the section away from the inside of the tube which is to be exposed to pressure, and therefore prevents the first detent from being exposed to this pressure. For example, the pressure moulding apparatus may include a corridor, within which the first detent can be located, whereby when the preform is in the apparatus a wall of the corridor contacts the preform at a point between where the tube extends from the radially inner end of the flange and the first detent, such that the wall forms a barrier between the first detent and the parts of the preform exposed to the pressure that is applied to expand the tube.

The apparatus of the fifth aspect may, in one embodiment, further comprise:

injection moulding apparatus shaped and arranged to produce a preform in the shape of a closed-end tube with a rim at its mouth, the rim comprising: (a) an outward generally-radial flange having an upper surface and a lower surface, the flange extending from a radially inner end to a radially outer end, the tube depending from the radially inner end of the flange; (b) a first detent simultaneously formed with the flange as an upstanding elongate projection from the upper surface of the flange, which detent is located at or near the radially inner end of the flange; and (c) a second detent simultaneously formed with the flange as an upstanding elongate projection from the upper surface of the flange, which detent is located at or near the radially outer end of the flange.

A preferred, non-limiting, embodiment of the invention is described in detail below with reference to the drawings.

BRIEF DESCRIPTION OF THE DRAWINGS

By way of example, the invention is described with reference to the accompanying drawings, in which.

DETAILED DESCRIPTION OF THE PREFERRED EMBODIMENT

The method of making a preferred embodiment of the invention and a preferred apparatus for making it, together with the resultant container and a lid for the container will now be described in detail by way of example.

The container is made by an essentially two-stage process. Stage one involves injection moulding, in an injection moulding machine, a preform. This stage may be carried out separately and therefore is not an essential stage of the claimed method. The preform may therefore simply be provided and then subjected to stage two.

It will therefore be appreciated that the process may be carried out in two separate stages, which may be carried out at different times and/or different locations. However, it is also contemplated that the two stages could be carried out one directly after the other, and possibly in the same location.

In stage two the preform is transferred to a pressure moulding machine where it is pressure moulded at an elevated temperature to form the final shape of the container. When placed into the pressure moulding apparatus the preform is deformed to form the rim of the container, and the body of the container is formed by blowing.

In a further stage (which again can be carried out separately and therefore is not an essential part of the claimed method) the container is associated with a corresponding push-on lid which can be push-fitted to the rim of the container. The container may be filled with product before push-fitting the lid onto the container.

Figure 1:
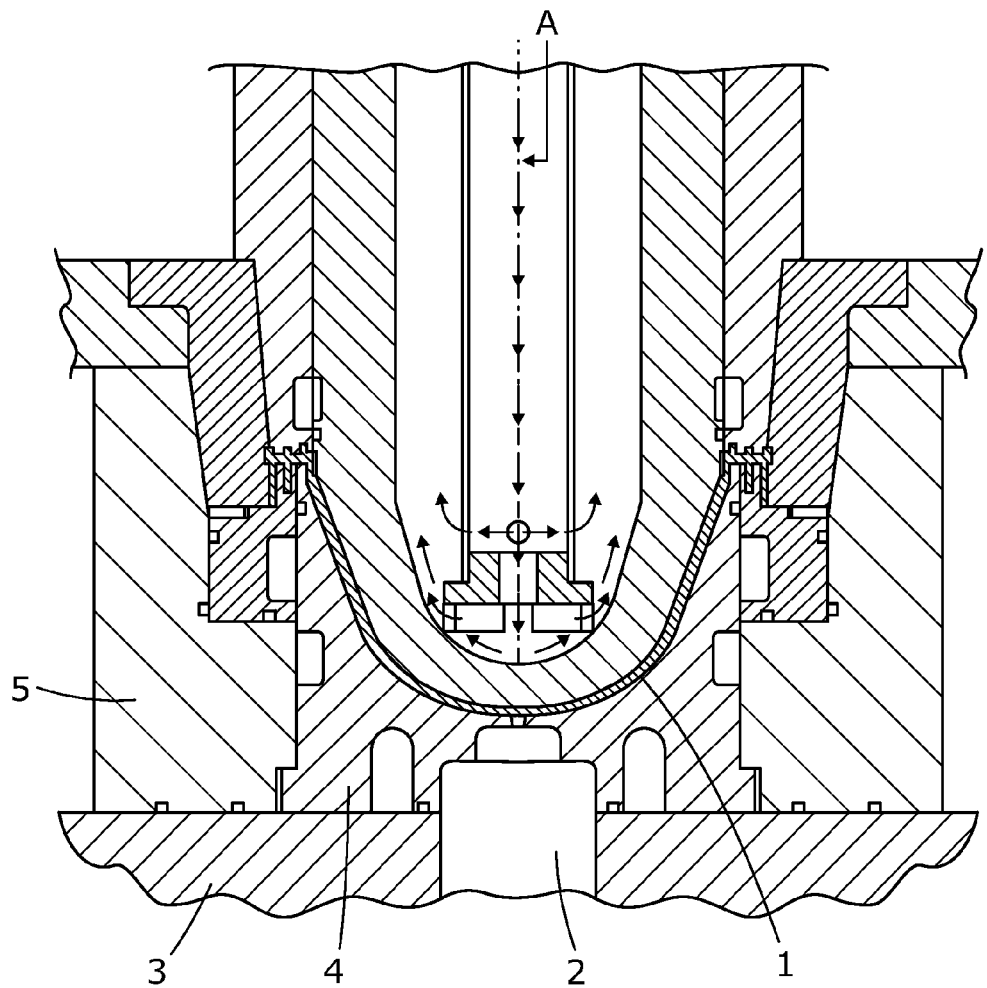
FIG. 1 is a sectional view showing the injection moulding of a preform used in manufacturing a plastics container in an embodiment of the invention.

Stage one is illustrated in FIG. 1. This figure shows a section through an injection moulding machine in which the preform has just been formed by injection moulding. The preform is shown at 1. The mould consists of a base plate 3, a cavity insert 4, a cavity insert carrying block 5 surrounding and supporting the cavity insert, neck splits supported by a neck split carrying plate and an injection core. There is also an injection nozzle 2. The preform is formed in the cavity between the cavity insert and the injection core, with the outer edge of the rim being defined by the neck splits.

The shape of the cavity is such that the preform is generally in the shape of a closed-end tube which tapers slightly towards its closed end, and has a rim at the open end of the tube and defining the opening or mouth of the container. The tubular part of the preform will eventually be expanded to form the body of the container. At this stage the outer surface and the inner surface of the preform both taper slightly towards the closed end of the tube, being defined by the inner mould surface of the cavity insert and the outer mould surface of the injection core, respectively. The plastics material is injected through the injection nozzle at the bottom end of the tube.

The rim section of the preform which is to form the mouth of the container and surrounds the opening to the tubular section of the preform is described in more detail below. The injection moulding apparatus is provided with appropriate cooling channels around the cavity insert, and a cooling tube extends into the interior of the injection core so as to cool the mould core portion within the tubular part of the preform. In other respects the injection moulding machine is conventional.

When sufficiently solid the preform is then removed from the injection moulding apparatus. This is achieved by retracting the injection core, and slightly retracting the neck splits on the neck split carrying plate.

The preform can then be removed from the mould, if necessary with the application of some pressure from the bottom through the injection orifice.

Figure 2:
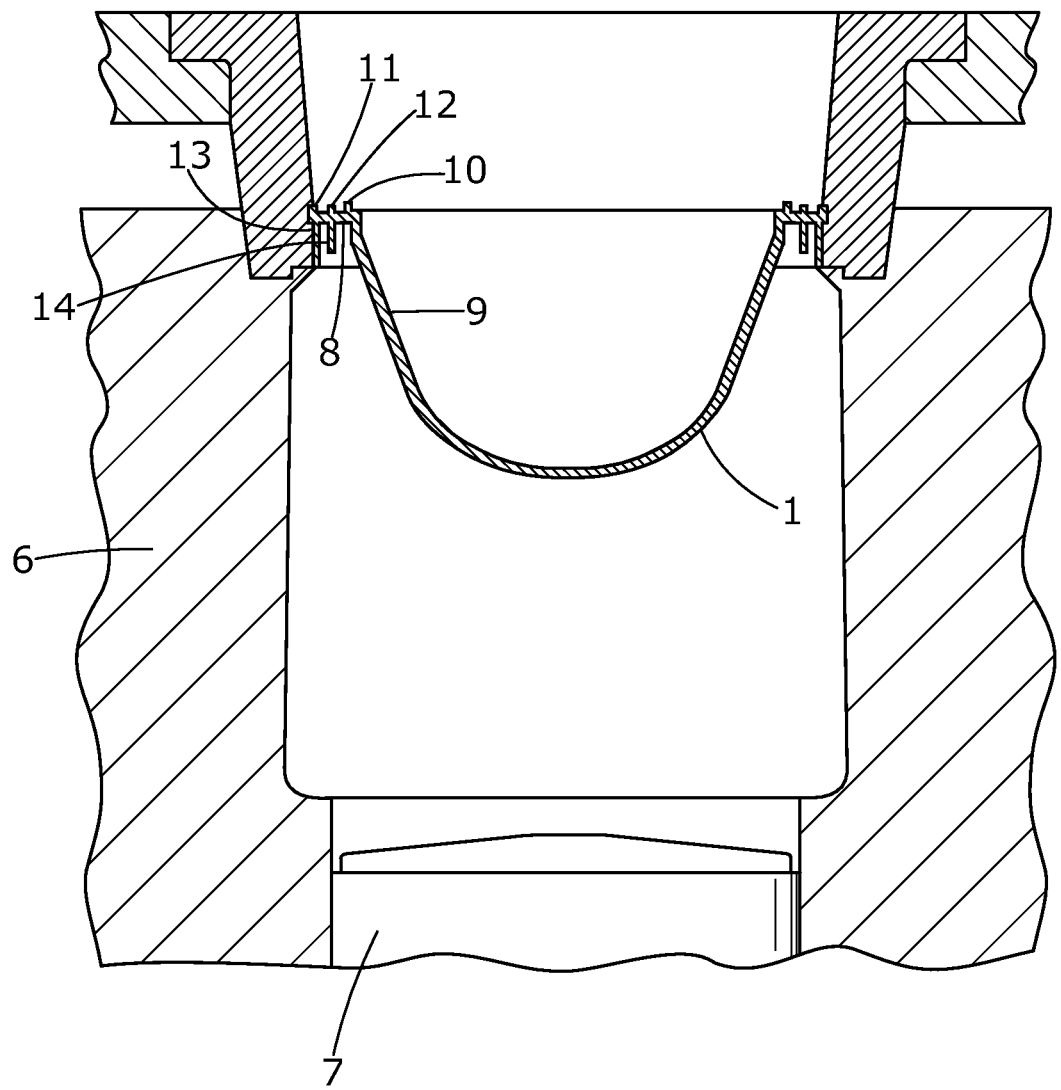
FIG. 2 shows the preform when transferred to a pressure or blow moulding machine.

FIG. 2 shows the overall shape of the preform 1. The closed-end tube 9 forms the greater part of the length of the preform, and terminates at the rim portion. There is a transverse or annular flange 8 extending outwardly from the top end of the tube 9.

The annular or outwardly-extending flange has an upper surface and a lower surface. The upper surface is in part over the tubular wall portion, which thus depends from the inner edge of the flange. The upper surface carries an upstanding first detent 10 at or towards its radially inner edge. The detent on its inner periphery is generally perpendicular to the upper surface, and on its outer face is generally perpendicular to the upper surface.

The outer end of the flange has an upwardly extending second detent 11. Towards the middle of the flange, approximately half way between the first detent and second detent, there is a third upwardly extending detent 12.

The lower surface of the flange carries a first downwardly extending flange 13 towards its outer end. There is also a second downwardly extending flange 14 extending from the lower surface of the flange, towards the middle of the flange, approximately half way between the first detent and second detent.

Figure 3:
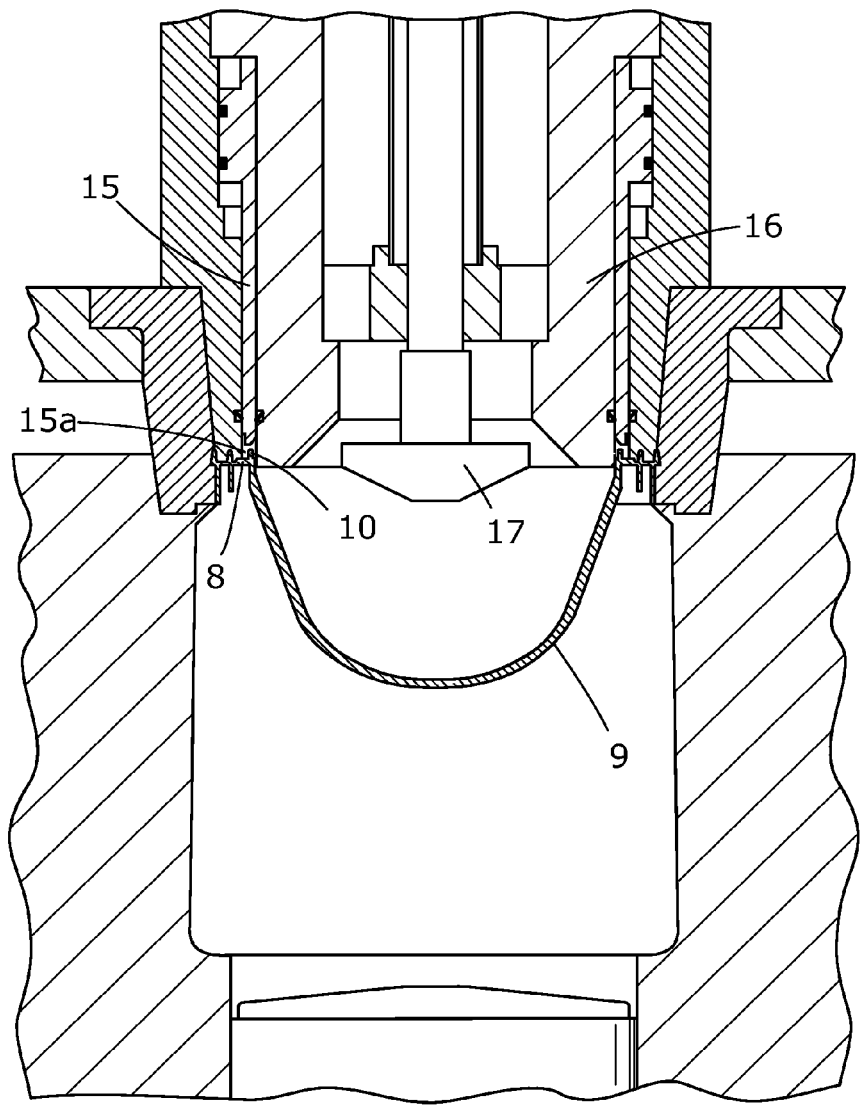
FIG. 3 shows the preform as in FIG. 2 with the blow core now in place.

The preform is transferred to a pressure moulding (or blow moulding) machine, a section through which is shown in FIGS. 2 and 3. The preform may be heated to a temperature above the glass transition temperature of the material of the preform, e.g. 10 to 40° C. above that glass transition temperature.

The operation that takes place in the pressure moulding machine is to (1) expand the tube portion of the preform to fill the inside of the mould and form the body of the container and then (2) move the first detent in a controlled manner downwardly and outwardly, relative to the second detent.

What is key is that both step (1) of expanding the tube portion of the container to fill the inside of the mould and form the body of the container and step (2) of moving the first detent downwardly and outwardly, relative to the second detent are carried out, and that step (2) is carried out in a controlled manner, without using the pressure of step (1).

The step (1) of expanding the tube portion of the container to fill the inside of the mould and form the body of the container may result in some movement of the first detent 10, due to the stretching of the tube 9 causing a downward pull on the flange 8 and first detent 10. However, it is essential that a controlled movement of the first detent 10 occurs after the tube portion of the preform has been expanded to form the body of the container.

The mould parts of the machine define the final shape of the container. The exterior part of the body of the container is defined by three mould parts, namely two generally semi-cylindrical side mould parts 6 separable at an axial plane, and a base plate 7 forming the base of the container. The blow mould also includes neck splits carried by a neck split carrying plate.

The apparatus also includes a piston 15 which can exert a controlled pressure of 600 kPa or higher, e.g. from 1000 to 1500 kPa, for from 0.1 s to 1 s or more, e.g. from about 0.5 s to 5 s or more. The piston is provided with a stop so that it can only move a controlled, predetermined, distance.

In particular, the piston 15 may be provided as part of the same machinery that comprises the stretch rod or blow pin 17, which can be extended to reach the bottom of the mould cavity, and is described below.

The pressure moulding machine includes a corridor 15a, within which the piston 15 can move. The first detent can be located within this corridor.

It may be that when the preform 1 is in the machine a wall of the corridor contacts the preform at a point between where the tube 9 extends from the radially inner end of the flange 8 and the first detent 10, such that the wall forms a barrier between the first detent and the parts of the preform exposed to the pressure that is applied to expand the tube. This therefore ensures that during the expansion of the tube under pressure, the first detent 10 is not exposed to the pressure.

When the preform 1 is first inserted in the moulding machine, it is carried by the exterior portion of the rim, and in particular the second detent 11 on the exterior of the rim, engaging with correspondingly-shaped portions on the lower internal surface of the neck splits. The second detent 12 also engages with a corresponding shaped portion of the neck splits. The operation of the moulding machine in shaping the container will now be described with reference to FIGS. 3 to 5.

The pressure used in this step may be a conventional pressure for blow moulding a container, e.g. from 300 to 950 kPa. The key is that differential pressure is achieved by injecting pressurised air sufficient to expand the tube body 9.

During the step of expanding the tube, the first detent is not exposed to any downward pressure from the blowing out of the preform tube. The piston 15 and the associated corridor 15a in which it moves shield the first detent from the downwardly moving pressurised air.

However, the first detent 10 may still move downwardly and outwardly during this step. This can be seen more clearly in FIGS. 14 and 15, where it can be seen that the expansion of the tube body 9 results in both the first detent 10 and the portion of the flange 8 between the first detent 10 and third detent 12 being drawn downwardly as well. In particular, because the flange 8 and first detent 10 are joined to the tube body via the upper section 9a of the tube body, and are not held in position by the neck splits (unlike the second and third detents) the downward movement of the tube body causes the flange and first detent to also move downward to an extent. It can be seen from FIG. 15 that the movement of the first detent is to a position where it is at an angle of about 5 to 10 degrees to the second detent.

The second step, which is carried out after the tube body of the preform has been expanded to form the container body, then involves the controlled movement of the first detent 10 to a position where its elongate axis is at an angle of from 60° to 120° to the elongate axis of the second detent, such that the first detent forms an internal rim.

During the step of moving the first detent, in effect the first detent moves pivotally around the second detent, due to bending of the flange portion particularly at its outer region. The result of this movement is that the upper surface of the flange now faces inwardly rather than upwardly, and forms the inward part of the mouth of the container. The first detent now projects inwardly into the container opening. In this position, as described below, a lid can be push-fitted onto the rim portion of the container, to engage the first, now inwardly facing, detent.

Figure 5:
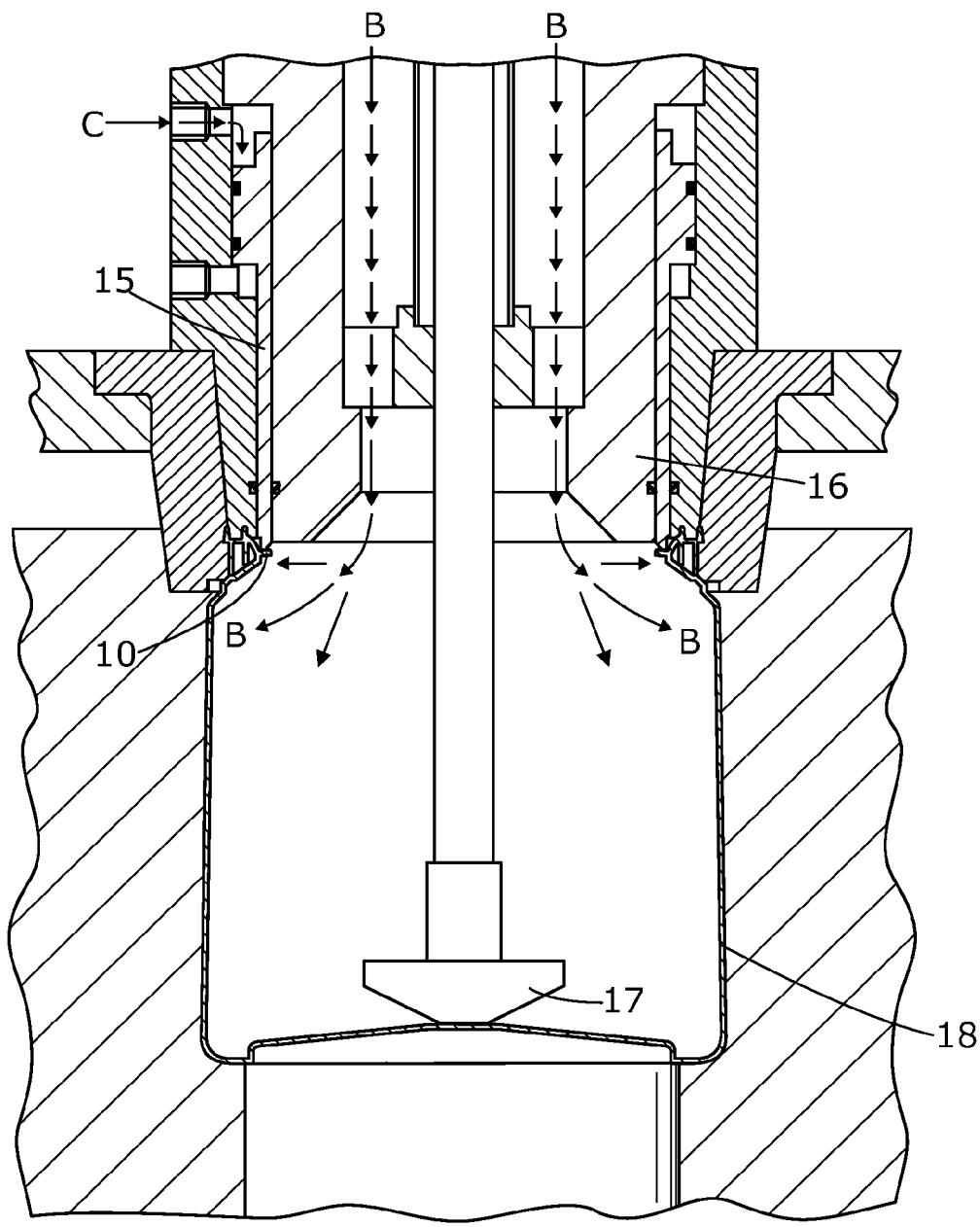
FIG. 5 shows the container in the blow moulding apparatus when the container has been blown under pressure.
Figure 6:
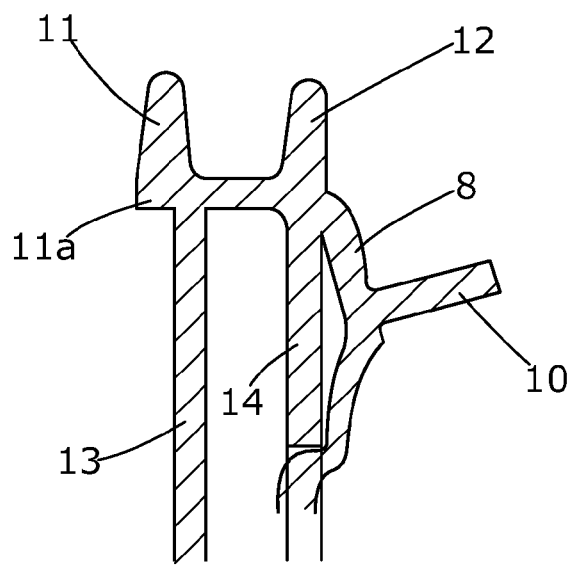
FIG. 6 is a detail showing the shape of the rim of the finished container more clearly.

In more detail therefore, FIG. 5 shows the preform 1 in the moulding machine, with the blow core 16 of the moulding apparatus now inserted in the mouth of the mould cavity. The blow core is shaped to seal against the top of the mould when fully inserted and has a central throughway through which passes a stretch rod or blow pin 17 which can be extended to reach the bottom of the mould cavity, as described below. The longitudinal passage through which the blow pin passes is wide enough also to provide for the flow of air under pressure through the blow core past the blow pin and into the interior of the tubular portion of the preform. An air inlet guide bush is provided within the blow core. The blow core extends into the tubular section below the periphery of the rim portion of the preform.

Figure 4:
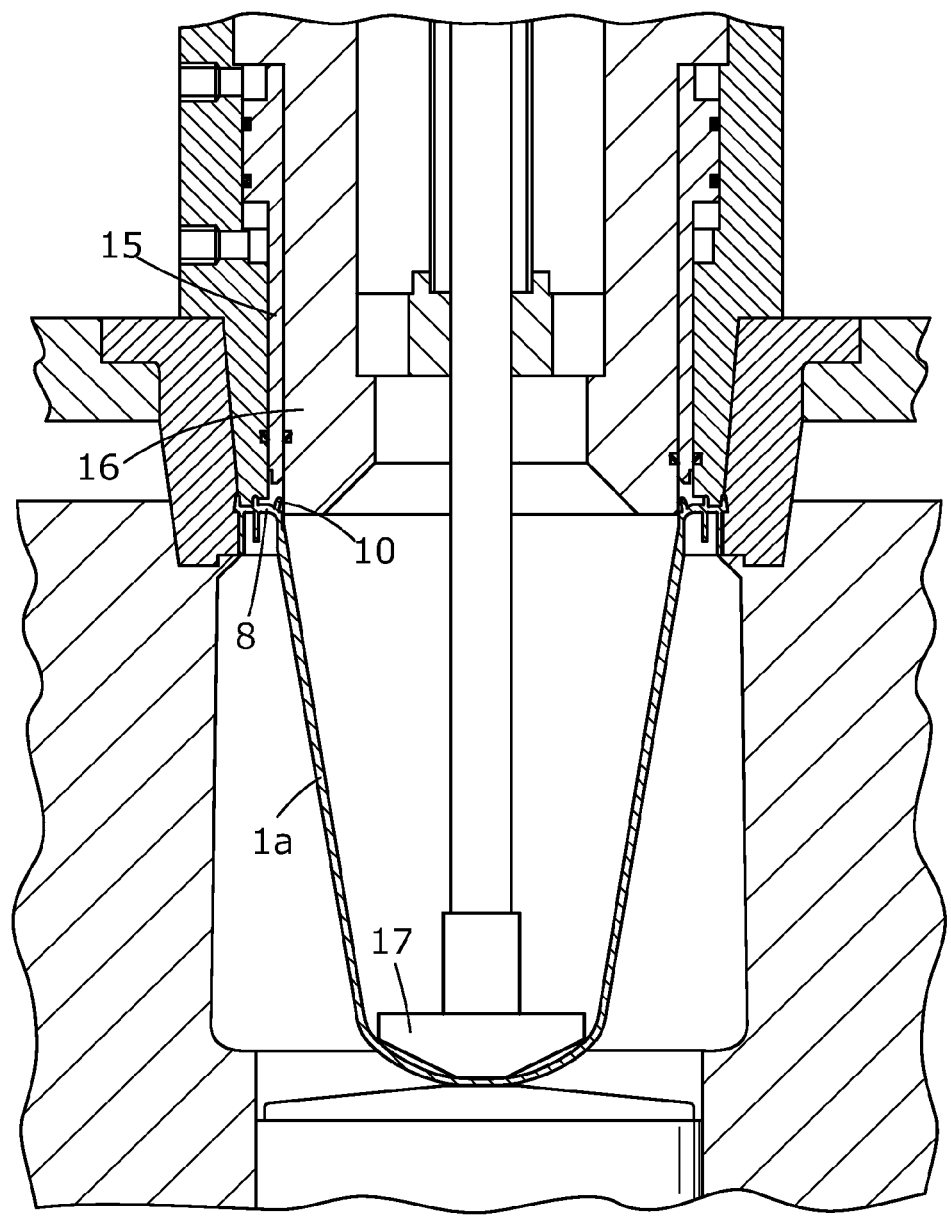
FIG. 4 shows the preform with the stretching rod partially descended and with the blow core bearing against the inside of the rim of the preform.

The next stage is for the blow pin 17 to be extended. The blow pin is now fully inserted into the mould cavity, causing the production of a stretched tubular section 1a which is stretched longitudinally down to the bottom end of the mould, as shown in FIG. 4. This stretching operation is important in providing strength to the finished container when made of PET or PEN.

Next, air under pressure is injected through the passageway in the blow core and around the blow pin into the interior of the container, as shown by arrows B in FIG. 5. The effect of this is to expand the tubular section 9 into the shape of the container 18 as defined by the interior surfaces of the mould parts, forming the desired final shape of the container.

The mould parts may carry desired shaping to provide a more complex shaping for the container in a well known manner.

The expansion of the tubular part will of course cause thinning of the container wall.

Figure 14:
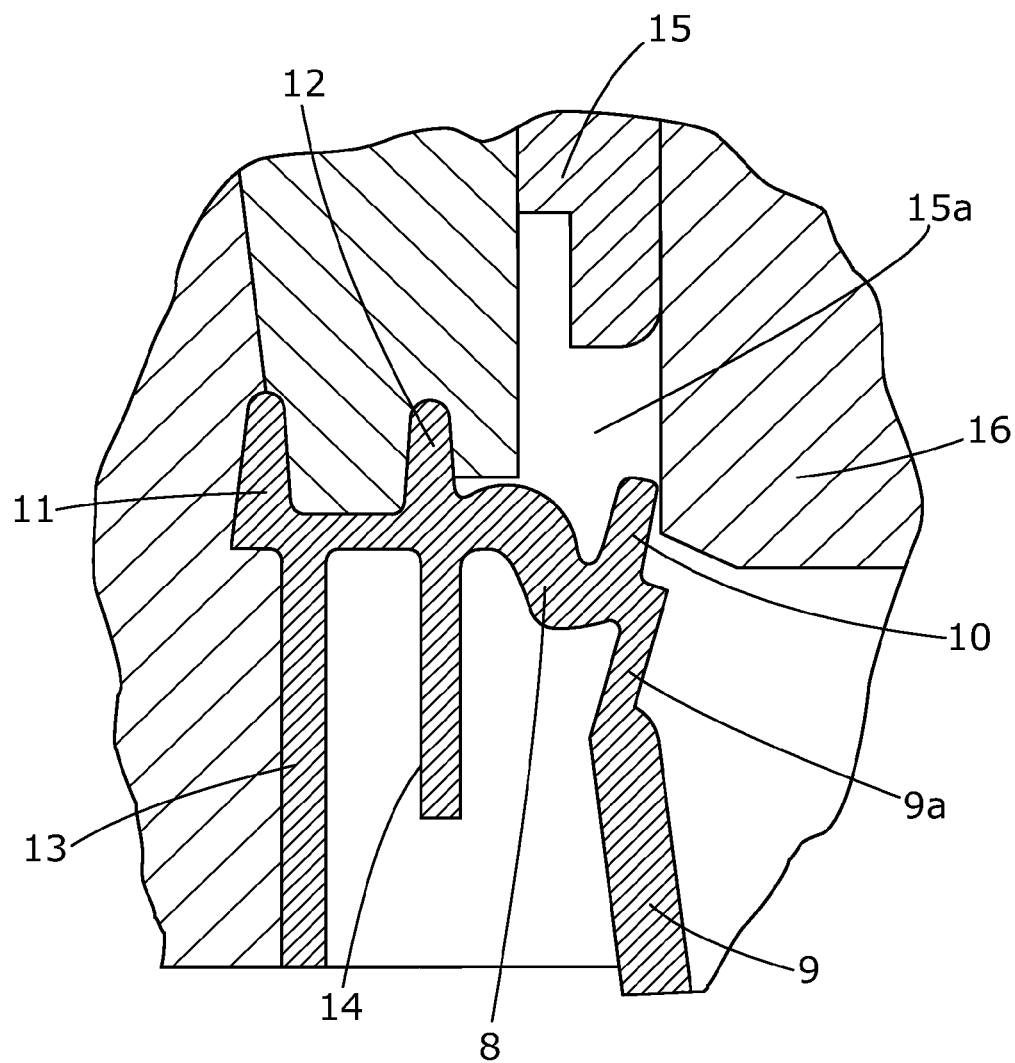
FIG. 14 is a detail showing the shape of the rim at a stage during the step of the container being blown under pressure.
Figure 15:
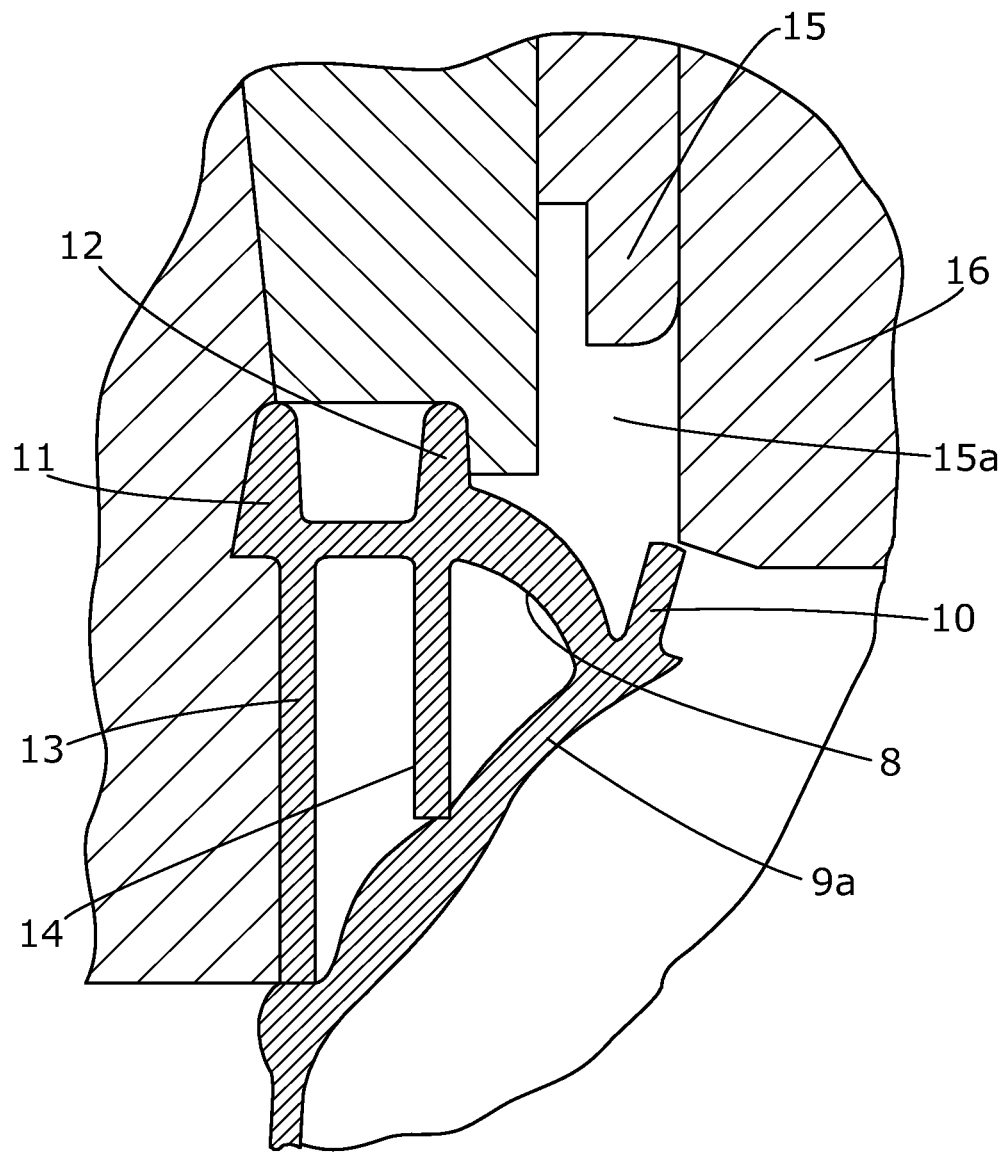
FIG. 15 is a detail showing the shape of the rim after the container has been blown under pressure.

The effect of the expansion of the tubular section may also be that the first detent 10 and the portion of the flange 8 between the first detent 10 and third detent 12 are both drawn downwardly as well. In particular, as shown in FIGS. 14 and 15, because the flange 8 and first detent 10 are joined to the tube body via the upper section 9a of the tube body, and are not held in position by the neck splits (unlike the second detent 11 and third detent 12) the downward movement of the tube body causes the flange and first detent to also move downward to an extent. It can be seen from FIG. 15 that the movement of the first detent is to a position where it is at an angle of about 5 to 10 degrees to the second detent.

The final step is that the piston 15 moves downwardly due to air pressure from air inlet C to exert a downward pressure on the first detent 10, which is moved downwardly and outwardly, relative to the second detent 11, forcing the upper surface of the flange 8 to face inwardly. The second detent 11 is retained in position by its engagement with the neck splits, as is the third detent 12. The pressure applied by piston 15 may suitably be from 1100 to 1600 kPa.

Figure 16:
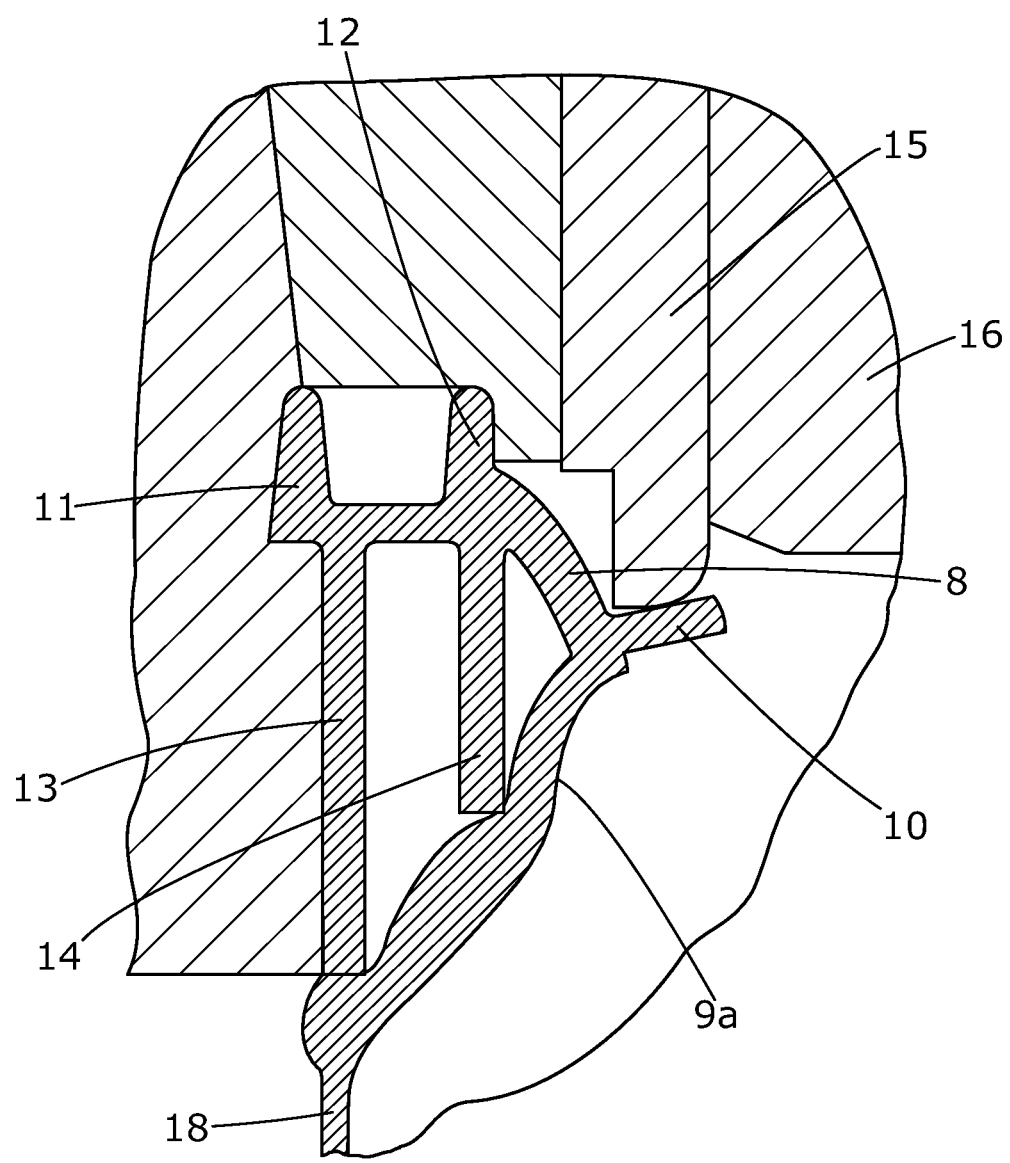
FIG. 16 is a detail showing the shape of the rim at a stage during the step of the detent being moved in a controlled manner into the internal rim position.

FIG. 16 shows in more detail the position of the first detent 10 as it is moved downwardly by the piston 15 during this step.

Due to the fact that the plastic is at an elevated temperature, the underside of the flange melts into and becomes homogeneous with the downward flange 14, thereby providing strength and solidity to the structure.

It is known in the art to cause an indent to be formed in the base of a blown out container by after the preform has been expanded to form a container. Therefore this step may be carried out, by the shaped upper surface of the base plate 7 being moved against the outside of the base of the container 18 whilst the material of at least that part of the container is still soft. This can be seen in FIG. 5. The "blowing out" pressure B that was used to expand the tube to form the body of the container is maintained whilst the base plate engages with and shapes the base of the container, in order to ensure that the remainder of the container retains its desired shape. However it will be appreciated that this step does not cause expansion of the tube and hence is not a concern in terms of causing uncontrolled movement of the first detent 10 after it has been moved into position by the piston 15.

The piston 15 may suitably remain in contact with the first detent 10 until the production of the indentation in the base of the container is complete.

Figure 7:
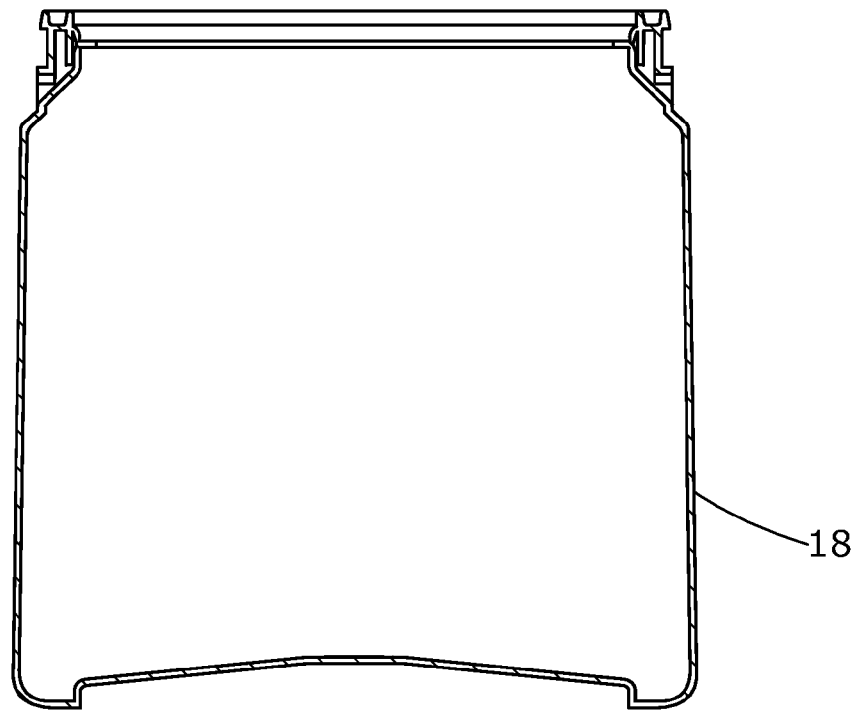
FIG. 7 is a side view of the container.

The container 18 is now removed from the mould and is shown in FIG. 7.

Figure 8:
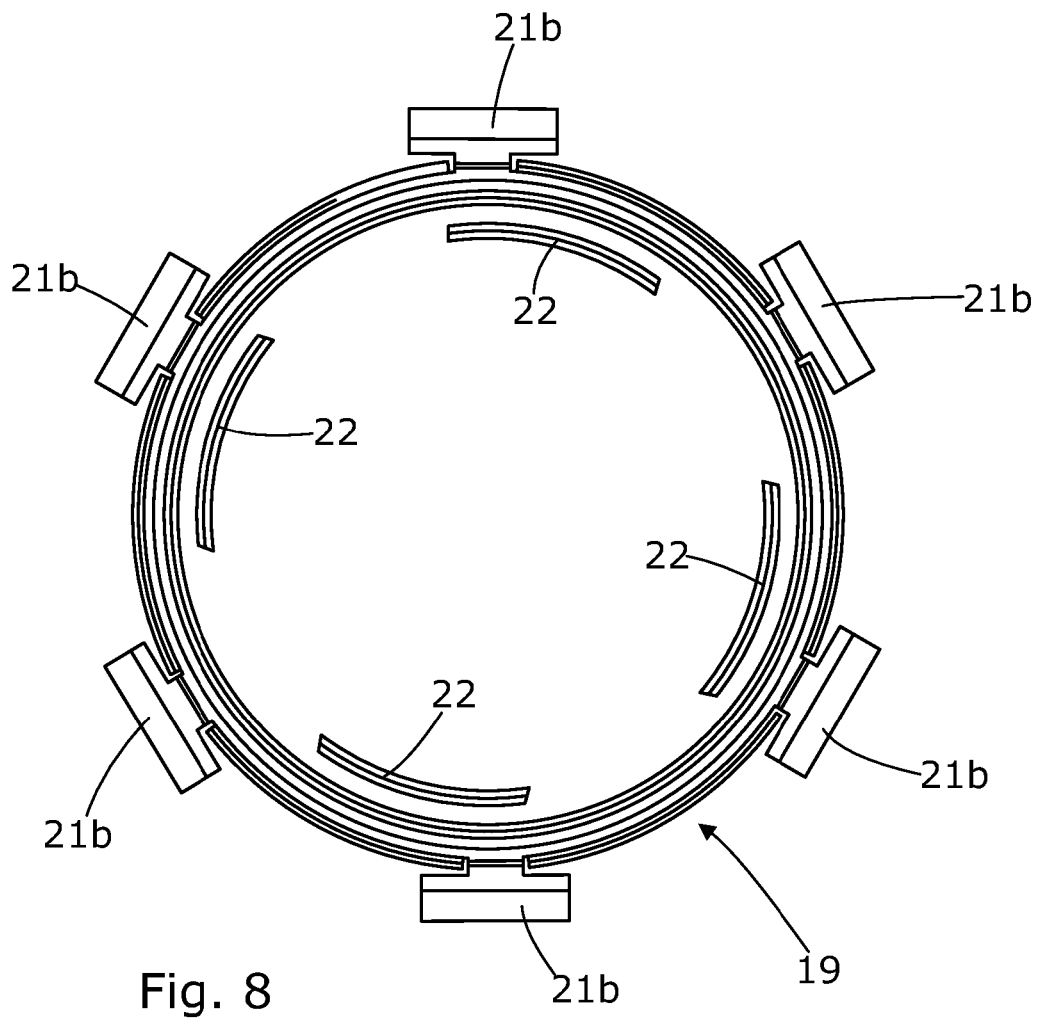
FIG. 8 is a view from below of a lid for the container.
Figure 9:
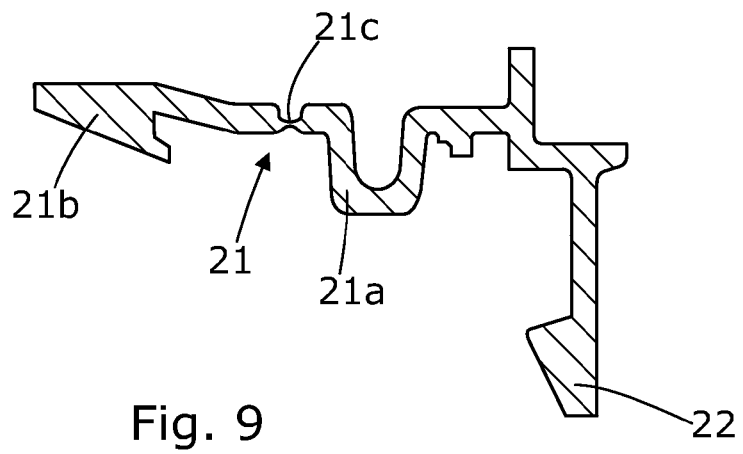
FIG. 9 is a cross sectional view showing the shape of the periphery of the lid more clearly.

One version of a lid 19 for the container will now be described with reference to FIGS. 8 and 9.

The lid 19 has a peripheral trough 21 suitable for receipt of and engagement with the first upwardly facing detent. The lid also has an engaging portion 22 located radially inwardly from the peripheral trough for receipt under and engagement with the inwardly facing first detent 10, to secure the lid on the container.

The engaging portion 22 is discontinuous around the lid. There are four regularly spaced sections making up the engaging portion. Accordingly, the engagement of the engaging portion with the inwardly facing first detent 10 provides a push and twist, bayonet style, fastening of the lid to the container.

The peripheral trough 21 is defined between an inner cylindrical flange 21a and an outer cylindrical flange 21b. The inner cylindrical flange is fixed, whilst the outer cylindrical flange is hinged, being a "click-lock" type hinge. Specifically, it moves about hinge 21c so that it can move from an open position where it does not engage with the first upwardly facing detent (as shown in FIG. 9) to a closed position where it does engage with the first upwardly facing detent.

The outer cylindrical flange is discontinuous and is made up of six regularly spaced sections.

The lid may be polyethylene or polypropylene.

Figure 10:
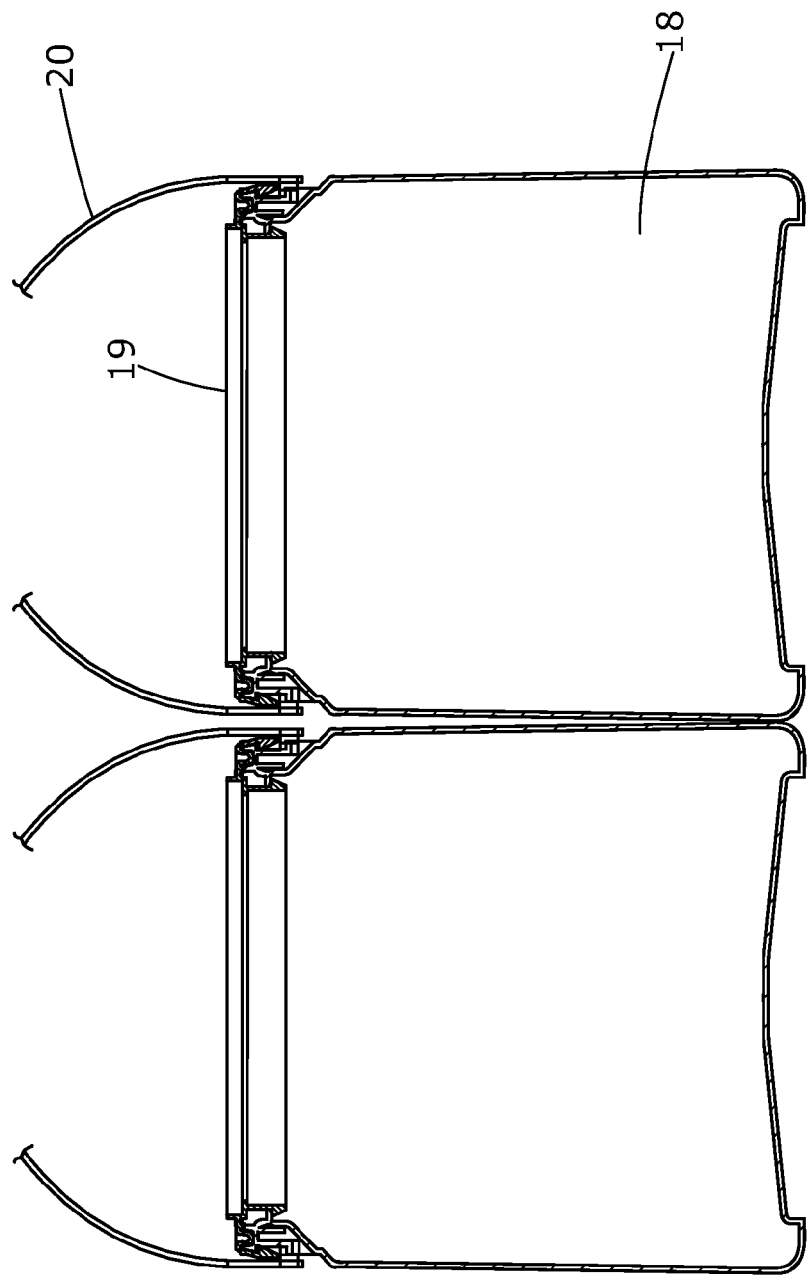
FIG. 10 is a side view of two of the containers stacked side by side.

FIG. 10 shows a side view of two completed containers with their lids attached. The lid 19 is securely held on the container 18. The containers also have handles 20. Due to the narrow width of the rim of the container as compared to the body, the handles can be provided without affecting the overall width of the container and therefore improved side by side stacking can be achieved, as shown.

Figure 11:
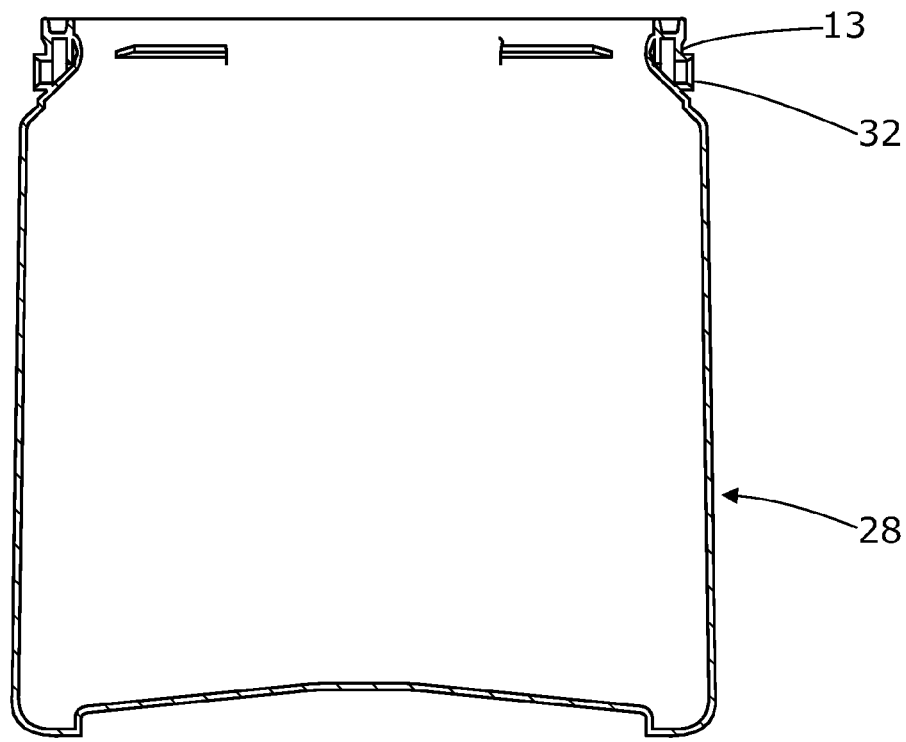
FIG. 11 is a side view of an alternative embodiment of the container.
Figure 12:
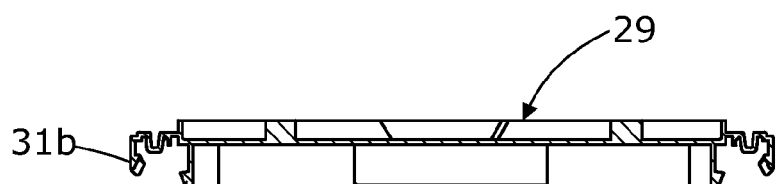
FIG. 12 is a cross sectional view of the lid for the alternative embodiment of the container.
Figure 13:
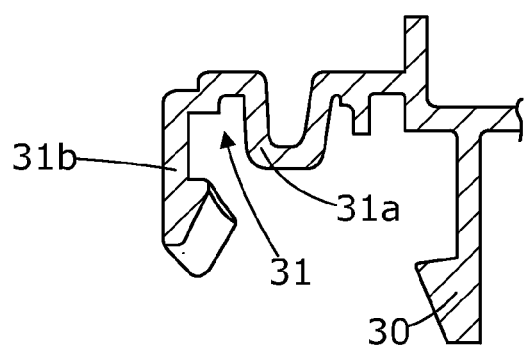
FIG. 13 is a cross sectional detail showing the shape of the periphery of the lid of FIG. 12 more clearly.

An alternative embodiment of the container is shown in FIG. 11, and the lid for the alternative container is shown in FIGS. 12 and 13. This container 28 and lid 29 are the same as those described above with reference to FIGS. 1 to 10, except for the following details.

The container 28 is provided with external lugs 32. These lugs are provided on the injection moulded preform from which the container is formed and are unaffected by the pressure blow moulding of the container. The lugs are provided on the outer surface of the first downwardly extending flange 13.

The container has four regularly spaced lugs 32 around its outer periphery.

The lid 29 has a peripheral trough 31 and an engaging portion 30 as above; however the peripheral trough 31 is defined between a fixed inner cylindrical flange 31a and a fixed outer cylindrical flange 31b.

The fixed outer cylindrical flange 31b is shaped to engage with the external lugs 32, so that the lugs hold the lid in place on the container.

A preferred embodiment of the invention has been described by way of example. However, many modifications may be made to the method, apparatus, container and container top described, and the foregoing description should be regarded only as one example of the implementation of the invention.

I claim:

1. A method of making a container having a body and a rim defining an opening for the container, the opening being capable of being closed by a push-on lid, the container being made of a material which is susceptible to deformation when heated, the method comprising the steps of:
   a) providing a preform made of a material which is susceptible to deformation when heated, the preform being in the shape of a closed-end tube with a rim at its mouth, the rim comprising: an outward generally-radial flange having an upper surface and a lower surface, the flange extending from a radially inner end to a radially outer end, the tube depending from the radially inner end of the flange; a first detent simultaneously formed with the flange as an upstanding elongate projection from the upper surface of the flange, which detent is located at or near the radially inner end of the flange; and a second detent simultaneously formed with the flange as an upstanding elongate projection from the upper surface of the flange, which detent is located at or near the radially outer end of the flange;
   b) placing the preform in a pressure moulding apparatus at an elevated temperature with the preform being located in the apparatus at least in part by the second detent;
   c) expanding the tube under pressure to form the body of the container; and then
   d) moving the first detent in a controlled manner downwardly and outwardly relative to the second detent so that the first detent projects inwardly into the opening for the container;
   wherein the movement of the first detent downwardly and outwardly relative to the second detent occurs after the tube has been expanded, and is controlled such that after step d) the first detent projects inwardly into the container, with its elongate axis at an angle of from 60° to 120° to the elongate axis of the second detent, such that the first detent forms an internal rim.

2. The method of claim 1, wherein in step c) the first detent is allowed to move to the extent that this is caused by the tube causing a downward pulling force on the first detent as it is expanded to form the container body.

3. The method of claim 1 wherein the movement of the first detent downwardly and outwardly relative to the second detent is controlled to only occur after step c), and such that after step d) the first detent projects inwardly into the container, with its elongate axis at an angle of from 60° to 120° to the elongate axis of the second detent, such that the first detent forms an internal rim.

4. The method of claim 1 wherein the first detent is shielded from the pressure applied in step c) due to it being located in the pressure moulding apparatus in a location that is not exposed to the pressure applied in step c), wherein the first detent does not experience outwardly urging pressure from the pressure moulding apparatus.

5. The method of claim 4, wherein the first detent is located in a section within the pressure moulding apparatus, wherein this section is separated from the inside of the tube which is to be exposed to outwardly urging pressure, to cause expansion of the tube, by a shielding wall.

6. The method of claim 1 wherein there is no further expansion of the tube to form the body of the container after the controlled movement of the detent in step d).

7. The method of claim 1 wherein after step d) there is a step of forming an indentation in the base of the container.

8. The method of claim 1 wherein the inward projection of the detent after step d) is such that its elongate axis is at an angle of from 75° to 105° to the elongate axis of the second detent.

9. The method of claim 1 wherein the inward projection of the detent after step d) is such that it does not extend beyond 95° to the elongate axis of the second detent.

10. The method of claim 1 wherein in step d) the movement of the first detent is achieved by applying downward pressure of 600 kPa or higher to the first detent, whilst supporting the second detent in a fixed position, so as to cause the first detent to move downwardly and outwardly with respect to the second detent.

11. The method of claim 10 wherein the pressure used is from 1000 to 2000 kPa.

12. The method of claim 1 wherein in step d) the pressure is applied for 0.05 seconds to 5 seconds or more.

13. The method of claim 1 wherein step d) uses a mechanical device, to place controlled downward pressure on the first detent.

14. The method of claim 1 wherein in step d) the pressure is applied pneumatically, hydraulically, or elastically.

15. The method of claim 1 wherein the preform provided in step a) has been injection moulded.

16. The method of claim 15, wherein step a) comprises the step of injection moulding the preform in an injection moulding apparatus in order to provide the preform.

17. The method of claim 1 wherein the preform has a third detent located between the first detent and the second detent, wherein the third detent and second detent between them define a trough, suitable for receipt of a correspondingly shaped sealing projection on the container lid, there being a sealing portion in the trough for sealing engagement with the sealing projection of the lid.

18. The method of claim 1 wherein the preform is made from a thermoplastic material.

19. The method of claim 18 wherein the material is selected from polyethylene terephthalate, polyethylene naphathalate, and co-polymers and blends of these two materials.

20. The method of claim 1 wherein step b) is carried out using pressure moulding apparatus having mould parts defining a mould cavity and comprising: a securing component that permits the location of the preform in the mould cavity with the second detent in a fixed location therein; a generator of a pressure differential between the interior of the tube and the exterior to expand the tube into contact with the mould parts defining the mould cavity; and a source of controlled downward pressure, that can act to move the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

21. The method of claim 20, wherein the pressure moulding apparatus further comprises a shield for shielding the first detent from the pressure differential that is applied to expand the tube, wherein the first detent does not experience an outwardly urging pressure from the pressure moulding apparatus.

22. The method of claim 1 wherein step c) comprises applying differential pressure between the interior of the preform and the exterior of the preform, to expand the tube portion to form the body of the container.

23. The method of claim 1 wherein the method further comprises the step of:
   e) filling the container with a product.

24. The method of claim 1 wherein after step d) or optional step e), the method further comprises the step of:
   f) fitting a lid to the container, in which the lid includes (i) a trough, suitable for receipt of and engagement with the second detent, and (ii) an engaging portion for receipt under and engagement with the inner rim formed by the first detent, to secure the lid on the container.

25. The method of claim 1 wherein during step d) a piston applies controlled downward pressure on the first detent.

26. The method of claim 1 wherein during step b) the pressure moulding apparatus further comprises: a plurality of mould parts defining a mould cavity; a securing component defining the location of the preform in the mould cavity with the second detent in a fixed location therein; a pressure differential generator disposed between the interior of the tube and the exterior of the tube for expanding the tube into contact with the mould parts defining the mould cavity; and a source of controlled downward pressure of at least 600 kPa for moving the flange and the first detent downwardly and outwardly relative to the second detent such that the upper surface of the flange faces inwardly and the first detent projects inwardly into the opening for the container, with its elongate axis at an angle of from 60° to 120° to the elongate axis of the second detent, such that the first detent forms an internal rim.

27. The method of claim 1, wherein the controlled movement of the first detent in step d) begins when step c) of expanding the tube under pressure to form the body of the container has started but has not been entirely completed.

28. The method of claim 1, wherein the controlled movement of the first detent in step d) does not begin at all until step c) of expanding the tube under pressure to form the body of the container is complete.

29. A method of making a container having a body and a rim defining an opening for the container, the opening being capable of being closed by a push-on lid, the container being made of a material which is susceptible to deformation when heated, the method comprising the steps of:
   a) providing a preform made of a material which is susceptible to deformation when heated, the preform being in the shape of a closed-end tube with a rim at its mouth, the rim comprising: an outward generally-radial flange having an upper surface and a lower surface, the flange extending from a radially inner end to a radially outer end, the tube depending from the radially inner end of the flange; a first detent simultaneously formed with the flange as an upstanding elongate projection from the upper surface of the flange, which detent is located at or near the radially inner end of the flange; and a second detent simultaneously formed with the flange as an upstanding elongate projection from the upper surface of the flange, which detent is located at or near the radially outer end of the flange;
   b) placing the preform in a pressure moulding apparatus at an elevated temperature with the preform being located in the apparatus at least in part by the second detent;
   c) expanding the tube under pressure to form the body of the container; and then
   d) moving the first detent in a controlled manner downwardly and outwardly relative to the second detent so that the first detent projects inwardly into the opening for the container;
   wherein the first detent is shielded from the pressure applied in step c) due to it being located in the pressure moulding apparatus in a location that is not exposed to the pressure applied in step c), and
   wherein the first detent is located in a section within the pressure moulding apparatus, wherein this section is separated from the inside of the tube which is to be exposed to pressure, to cause expansion of the tube, by a shielding wall.

* * * * *